US012562641B2

(12) United States Patent (10) Patent No.: US 12,562,641 B2
Butzen et al. (45) **Date of Patent: \*Feb. 24, 2026**

(54) MULTILEVEL SWITCHED CAPACITOR REGULATOR WITH MULTIPLE CORES

(71) Applicant: Intel Corporation, Santa Clara, CA (US)

(72) Inventors: Nicolas Butzen, Portland, OR (US); Harish Krishnamurthy, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 918 days.

This patent is subject to a terminal disclaimer.

(21) Appl. No.: 17/558,373

(22) Filed: Dec. 21, 2021

(65) Prior Publication Data

US 2023/0198384 A1 Jun. 22, 2023

(51) Int. Cl.
*H02M 3/07* (2006.01)
(52) U.S. Cl.
CPC ............. *H02M 3/07* (2013.01); *H02M 3/077* (2021.05)
(58) Field of Classification Search
CPC .............................................. H02M 3/07–078
See application file for complete search history.

(56) References Cited

U.S. PATENT DOCUMENTS 9,496,880 B1 * 11/2016 Yin ....................... H03L 7/0891
2017/0222538 A1 8/2017 Jung et al.

FOREIGN PATENT DOCUMENTS

CN 103124137 A 5/2013

OTHER PUBLICATIONS

Butzen, Nicolas, et al., "A 94.6%-Efficiency Fully Integrated Switched-Capacitor DC-DC Converter in Baseline 40nm CMOS Using Scalable Parasitic Charge Redistribution", IEEE International Solid-State Circuits Conference, 59, pp. 220-221.
Butzen, Nicolas, et al., "A Single-Topology Continuously-Scalable-Conversion-Ratio Fully Integrated Switched-Capacitor DC-DC Converter with 0-to-2.22V Output and 93% Peak-Efficiency", 2018 Symposium on VLSI Circuits Digest of Technical Papers, 2 pgs.

(Continued)

*Primary Examiner* — Peter M Novak
(74) *Attorney, Agent, or Firm* — NICHOLSON DE VOS WEBSTER & ELLIOTT LLP

(57) ABSTRACT

Techniques and mechanisms for providing an output voltage using any of multiple configurable modes of a switched capacitor voltage regulator (SCVR). In an embodiment, a switched capacitor (SC) voltage converter comprising buses, and cores each coupled to the buses. A first core of the cores comprises a capacitor, and a switch network by which a terminal of the capacitor is to be switchedly coupled to first ones of the buses. Controller circuitry is coupled to operate the SC voltage converter according to a currently configured one of the modes. The modes each correspond to a different respective sequence of switch states to be provided with the switch network. In an embodiment, a first switch state sequence and a second switch state sequence each include a different respective total number of switch states.

20 Claims, 11 Drawing Sheets

(56) References Cited

OTHER PUBLICATIONS

Butzen, Nicolas, et al., "Design of Single-Topology Continuously Scalable-Conversion-Ratio Switched-Capacitor DC-DC Converters", IEEE Journal of Solid-State Circuits, vol. 54, No. 4, Apr. 2019, 9 pgs.

Butzen, Nicolas, et al., "Fully Integrated Advanced Multiphasing Switched-Capacitor DC-DC Converters", Arenberg Doctoral School, Faculty of Engineering Science, Oct. 2018, 218 pgs.

De Vos, Julien, "Switched Capacitor DC/DC Converters in Nanometer CMOS Technologies for Micro-Power Energy Management", Ecole Polytechnique de Louvain ICTEAM Institute, Dec. 2013, 174 pgs.

Van Breussegem, Tom, et al., "A Fully Integrated Gearbox Capacitive DC/DC-converter in 90nm CMOS: Optimization, Control and Measurements", Accessed Sep. 24, 2021, 5 pgs.

European Search Report and Search Opinion, EP App. No. 22202231.1, Apr. 25, 2023, 11 pages.

Intention to Grant, EP App. No. 22202231.1, May 6, 2025, 6 pages.

* cited by examiner

200

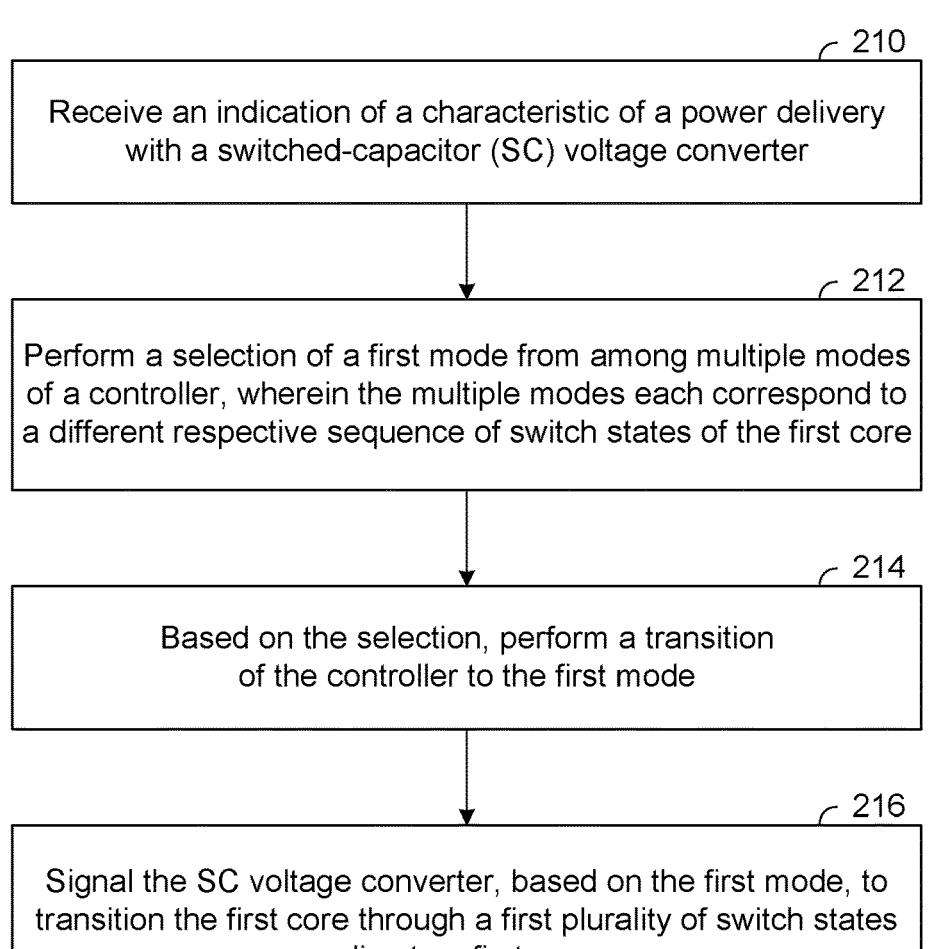

210

Receive an indication of a characteristic of a power delivery with a switched-capacitor (SC) voltage converter

212

Perform a selection of a first mode from among multiple modes of a controller, wherein the multiple modes each correspond to a different respective sequence of switch states of the first core

214

Based on the selection, perform a transition of the controller to the first mode

216

Signal the SC voltage converter, based on the first mode, to transition the first core through a first plurality of switch states according to a first sequence

SCVR 301

305b    305c

Vin

STin        SBout    Vout

T1    ST1      302      SB1    B1

TM    STM    304    306    SBN    BN

Vout    STout        SBss    Vss

Core 305a

Sensor(s) 310

312

Monitor 320

322

Mode selector 330

332

342

Control signal generator 340

CSI 346

| 344 | |
|---|---|
| 343a | 345a |
| ⋮ | ⋮ |
| 343y | 345y |

400

T5 — 417e 416e — 415e 414e ———— 411e 410e — 413e 412e — T4

T6 — 417d 416d — 415d 414d ———— 411d 410d — 413d 412d — T3

T7 — 417c 416c — 415c 414c ———— 411c 410c — 413c 412c — T2

T8 — 417b 416b — 415b 414b ———— 411b 410b — 413b 412b — T1

404

Vin — 417a 416a — 415a 414a ———— 411a 410a — 413a 412a — Vout

402

B4 — 423e 422e — 421e 420e ———— 425e 424e — 427e 426e — B5

406

B3 — 423d 422d — 421d 420d ———— 425d 424d — 427d 426d — B6

B2 — 423c 422c — 421c 420c ———— 425c 424c — 427c 426c — B7

B1 — 423b 422b — 421b 420b ———— 425b 424b — 427b 426b — B8

404

Vss — 423a 422a — 421a 420a ———— 425a 424a — 427a 426a — Vout

500

| Number of phases | | | | | |
|---|---|---|---|---|---|
| 1 | N | M | 1 | N | M |

Vin

T1

T2

⋮

TM

Vout

B1

B2

⋮

BN

Vss

Time 502 t1    t2    t3  t4    t5    t6

600

| | 0 | 1 | 2 | 3 | 4 | 5 | 6 | 7 | 8 | 9 |
|---|---|---|---|---|---|---|---|---|---|---|
| Top | Vout | Vout | Vout | Vout | Vout | Vout | Vout | Vout | Vout | Vout |
| Bottom | Vss | B5 | B5 | B4 | B4 | B3 | B3 | B2 | B2 | B1 |

| | 10 | 11 | 12 | 13 | 14 | 15 | 16 | 17 | 18 | 19 |
|---|---|---|---|---|---|---|---|---|---|---|
| Top | Vout | T2 | T2 | T1 | T1 | Vin | Vin | Vin | Vin | Vin |
| Bottom | B2 | Vout | Vout | Vout | Vout | Vout | B1 | B2 | B2 | B2 |

| | 20 | 21 | 22 | 23 | 24 | 25 | 26 | 27 | 28 | 29 |
|---|---|---|---|---|---|---|---|---|---|---|
| Top | Vin | Vin | Vin | Vin | Vin | Vin | T1 | T1 | T2 | T2 |
| Bottom | B3 | B3 | B4 | B4 | B5 | B5 | Vss | Vss | Vss | Vss |

| | 0 | 1 | 2 | 3 | 4 | 5 | 6 | 7 | 8 | 9 |
|---|---|---|---|---|---|---|---|---|---|---|
| Top | Vout | Vout | Vout | Vout | Vout | Vout | Vout | Vout | Vout | Vout |
| Bottom | Vss | B5 | B5 | B4 | B4 | B3 | B3 | B2 | B2 | B1 |

| | 10 | 11 | 12 | 13 | 14 | 15 | 16 | 17 | 18 | 19 |
|---|---|---|---|---|---|---|---|---|---|---|
| Top | Vout | T1-2 | T1-2 | Vin | Vin | Vin | Vin | Vin | Vin | Vin |
| Bottom | B2 | Vout | Vout | Vout | B1 | B2 | B2 | B2 | B3 | B3 |

| | 20 | 21 | 22 | 23 | 24 | 25 |
|---|---|---|---|---|---|---|
| Top | Vin | Vin | Vin | Vin | T1-2 | T1-2 |
| Bottom | B4 | B4 | B5 | B5 | Vss | Vss |

|  | 0 | 1 | 2 | 3 | 4 | 5 | 6 | 7 | 8 | 9 |
|---|---|---|---|---|---|---|---|---|---|---|
| Top | Vout | Vout | Vout | T2 | T2 | T1 | T1 | Vin | Vin | Vin |
| Bottom | Vss | B1-5 | B1-5 | Vout | Vout | Vout | Vout | Vout | B1-5 | B1-5 |

|  | 10 | 11 | 12 | 13 |
|---|---|---|---|---|
| Top | T1 | T1 | T2 | T2 |
| Bottom | Vss | Vss | Vss | Vss |

630

|  | 0 | 1 | 2 | 3 | 4 | 5 | 6 | 7 | 8 | 9 |
|---|---|---|---|---|---|---|---|---|---|---|
| Top | Vout | Vout | Vout | T1-2 | T1-2 | Vin | Vin | Vin | T1-2 | T1-2 |
| Bottom | Vss | B1-5 | B1-5 | Vout | Vout | Vout | B1-5 | B1-5 | Vss | Vss |

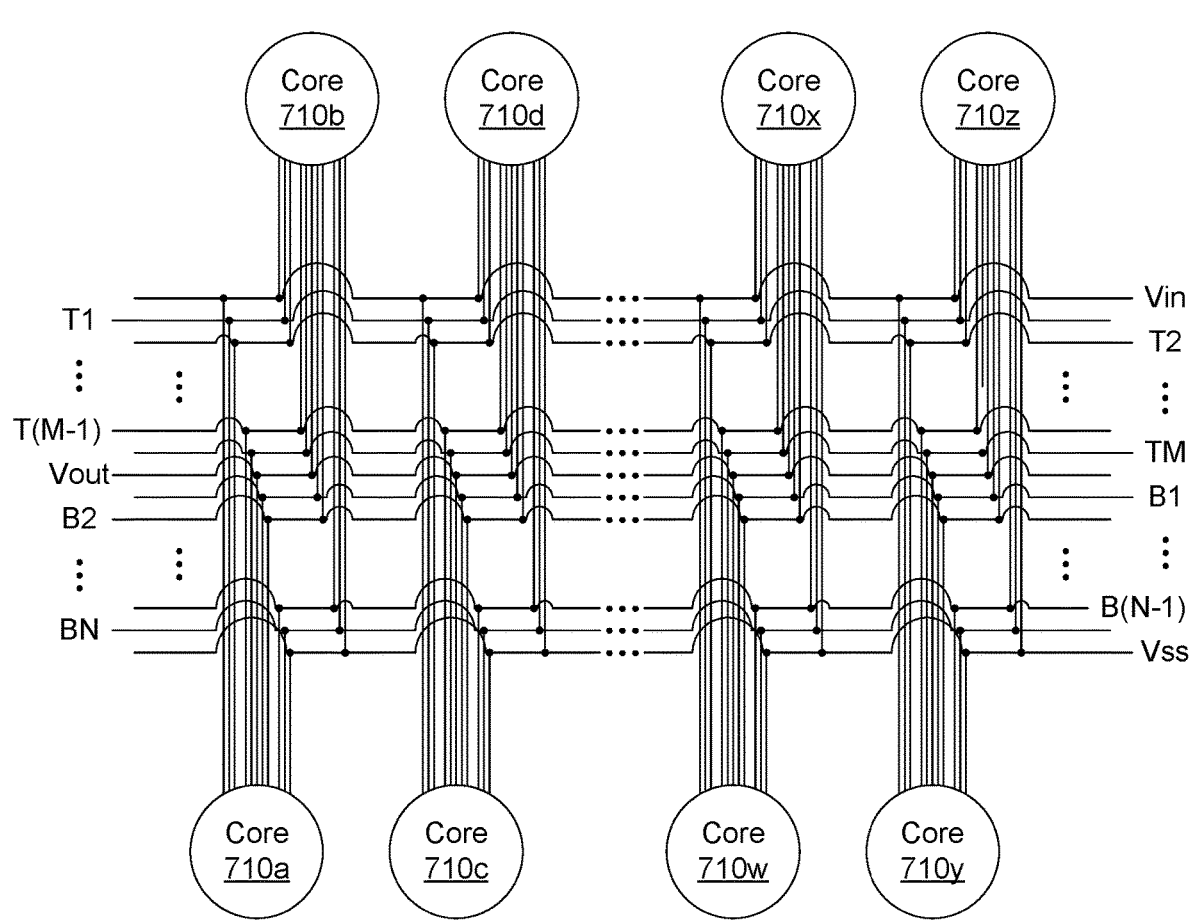
FIG. 7

800

810

Monitor a characteristic of power delivery with a SC voltage converter

812

Has the characteristic changed?

NO

YES

814

Does the changed characteristic correspond to the current control mode?

YES

NO

816

Select a next control mode, based on the changed characteristic, from among multiple available modes of a controller

818

Transition the controller to the next control mode

820

With the controller, signal the SC voltage converter to provide respective switch states according to a sequence which corresponds to the current control mode

FIG. 8

900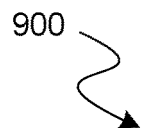
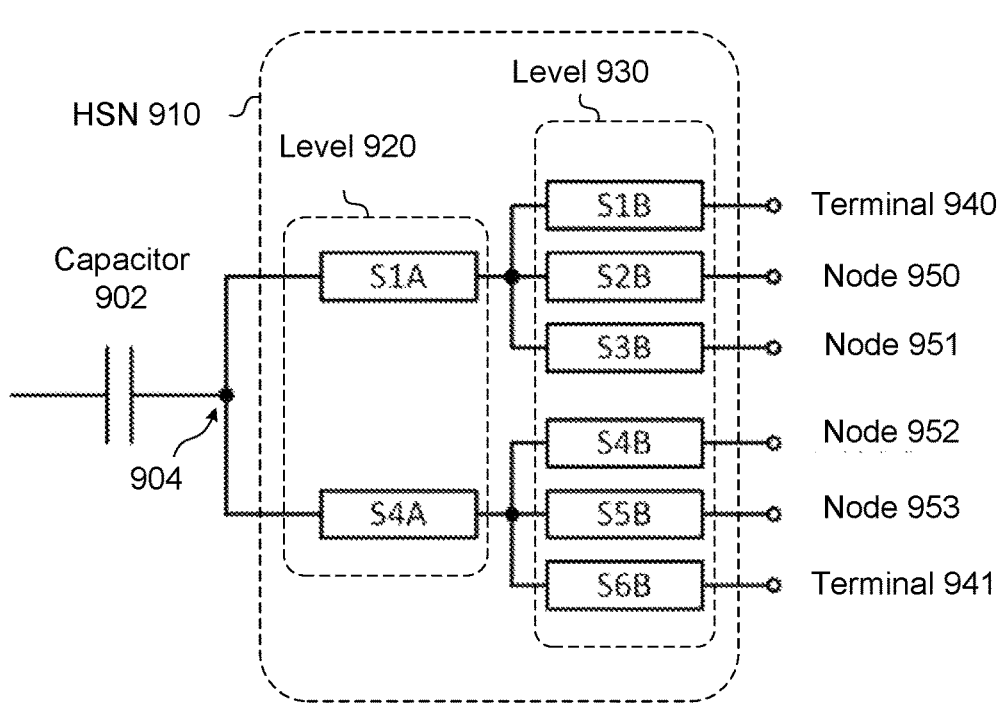
FIG. 9

MULTILEVEL SWITCHED CAPACITOR REGULATOR WITH MULTIPLE CORES

BACKGROUND

1. Technical Field

This disclosure generally relates to voltage converter circuitry and more particularly, but not exclusively, to operation of a voltage converter with a configurable number of phases.

2. Background Art

Many switched capacitor voltage regulator (SCVR) designs provide space and cost efficiencies due to their primary reliance on using only circuitry capacitors and switches. However, these designs are often limited to providing a relatively small range of conversion ratios around an ideal voltage conversion ratio (iVCR). These limitations have tended to be significantly detrimental to the adaptation of SCVRs for use with dynamic voltage and frequency scaling and/or other technologies that need to accommodate large voltage variations.

BRIEF DESCRIPTION OF THE DRAWINGS

The various embodiments of the present invention are illustrated by way of example, and not by way of limitation, in the figures of the accompanying drawings and in which:

FIG. 2 shows a flow diagram illustrating features of a method to determine an operation of a switched-capacitor voltage regulator according to an embodiment.

FIGS. 6A through 6D show sequence diagrams each illustrating respective operational states of a switched-capacitor voltage regulator according to a corresponding embodiment.

FIG. 7 shows a block diagram illustrating features of a switched-capacitor voltage regulator to redistribute charge between various cores according to an embodiment.

FIG. 8 shows a flow diagram illustrating features of a method to update a mode of a switched-capacitor voltage regulator according to an embodiment.

FIG. 9 shows a functional block diagram illustrating features of a voltage regulator core to provide switched coupling with a capacitor according to an embodiment.

DETAILED DESCRIPTION

Figure 1:
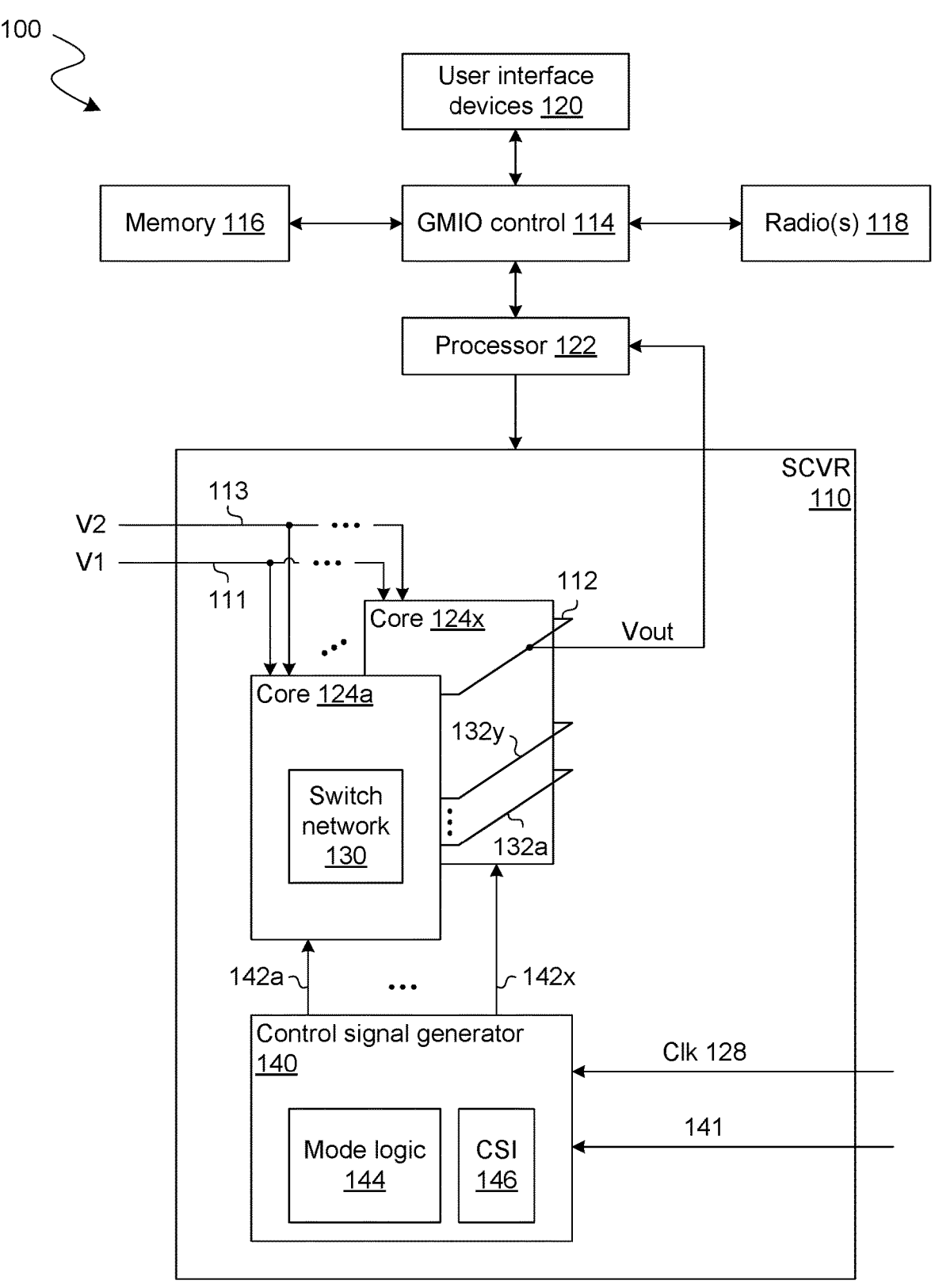
FIG. 1 shows a functional block diagram illustrating features of a system to provide a regulated voltage according to an embodiment.

Embodiments discussed herein variously provide techniques and mechanisms for providing an output voltage using any of multiple configurable modes of a switched capacitor voltage regulator. In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/-10% of a target value. For example, unless otherwise specified in the explicit context of their use, the terms "substantially equal," "about equal" and "approximately equal" mean that there is no more than incidental variation between among things so described. In the art, such variation is typically no more than +/-10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments variously provide structures of, and/or operations with, a switched-capacitor (SC) voltage converter which comprises multiple circuits-variously referred to herein as "converter cores," or simply "cores"—that are coupled in parallel with each other via multiple buses. In various embodiments, the multiple buses comprise a first bus, which is to receive an input voltage, and a second bus which is to provide an output voltage generated by the SC voltage converter based on said input voltage. In one such embodiment, the multiple buses further comprise a first one or more buses which are each to function as a respective charge redistribution bus (CRB). In this context, "charge redistribution bus" refers herein to a bus which is to conduct charges between two cores—e.g., wherein the bus is other than any by which an SC voltage converter is to receive a particular input voltage, or provide a particular output voltage (such as one of a supply voltage, a ground potential, or the like).

A given converter core according to some embodiments comprises a capacitor, and a first switch network which is coupled between the capacitor and various ones of the multiple buses. For example, such a switch network comprises switch circuits which are configured to facilitate the selective provisioning of one or more conductive paths each between the capacitor and a different respective bus of the multiple buses. In some embodiments, the core further comprises a second switch network which is also coupled to the capacitor—e.g., wherein the first switch network and the second switch network are coupled to the capacitor via different respective terminals thereof.

Operation of a SC voltage converter enables high-efficiency regulation of an output voltage, but (for example) tends to have a significant current output penalty. To realize these regulation efficiencies, a SC voltage regulator (SCVR) is traditionally designed and operated to provide a large total number (P) of charge redistribution phases, as well as number of time-interleaved converter cells. Given a fixed control frequency, the output current of such a SCVR tends to be inversely proportionate to the number P.

One problem with traditional SCVR operation is that, above a certain switching frequency—e.g., as determined by the effective resistor-capacitor (RC) time constant of a flying capacitor charging and discharging current paths—the amount of charge that is transferred per switching event will be reduced, particularly at higher output voltages. Consequently, the operation of a traditional SCVR—i.e., with control circuitry which, by design, accommodates only one number P-effectively limits the SCVR's maximum frequency and/or maximum current capability.

By contrast, various embodiments provide circuitry and/or other logic to accommodate any of multiple modes for controlling operation of a SC converter circuit, wherein some or all such modes each correspond to a different respective number P. Some embodiments variously facilitate a signal generation and/or control schema which enables a total number of intermediate soft-charging phases—and thus, the number P—to be selectively configured (e.g., reconfigured). For example, such (re) configuration is performed statically—e.g., using one or more configure bits or other suitable control parameters—or dynamically using a monitor and reconfiguration control loop.

By making the phase number P configurable, some embodiments variously enable operation of a SCVR in one mode which uses a relatively low P number—e.g., for a relatively high output current—to extend a current capability of the SCVR. In some embodiments, a given intermediate soft-charging phase in such a mode uses a combination of respective circuit paths which are used in multiple intermediate soft-charging phases of a different mode. This effectively merges the multiple phases—e.g., to reduce the RC time constant of the used circuit paths, further improving current capability.

In some embodiments, a number of soft-charging phases is reconfigured based on input voltage and/or an output voltage at a SCVR. For example, such reconfiguration is able to accommodate for instances where soft-charging phases at a capacitor's top side have reduced impact when the output voltage is high, and/or where soft-charging phases at the capacitor's bottom side have reduced impact when the output voltage is low.

FIG. 1 shows features of a system 100 to provide a regulated voltage according to an embodiment. System 100 illustrates one example of an embodiment wherein voltage regulation is provided with multiple cores of a switched capacitor converter circuit, wherein control logic facilitates operation of the multiple cores according to any of multiple configurable modes. In an embodiment, the modes each correspond to a different respective sequence of switch states of a given core.

As shown in FIG. 1, system 100 comprises one or more processors 122, a graphics/memory/input/output (GMIO) control 114, a memory 116, a wireless interface/radio 118, and user interface devices 120. For example, system 100 comprises some or all of a computing platform such as that of a test system, design/debug tool, laptop, personal digital assistant (PDA), wireless smart phone, media player, imaging device, or any other suitable apparatus. One or more components of such a platform are to receive power from voltage regulator (VR) circuitry, such as that of the illustrative switched-capacitor VR (or "SCVR") 110 shown.

By way of illustration and not limitation, processor 122 is coupled to receive a voltage Vout which is generated by the SCVR 110 of system 100. However, the particular one or more components of system 100 which are to receive power from SCVR 110 are merely illustrative, and in other embodiments, SCVR 110 provides power to any of various additional or alternative components. Some embodiments are provided entirely with circuitry of SCVR 110, and/or entirely with logic (comprising hardware, firmware and/or executing software) which provides functionality to configure a mode of operation of said circuitry.

In the example embodiment shown, processor 122 is coupled to memory 116, radios 118, and user interface devices 120 through GMIO control 114. GMIO control 114 includes one or more blocks (e.g., chips or units within an integrated circuit) to perform various interface control functions (e.g., memory control, graphics control, I/O interface control, and the like). These circuits are implemented, for example, on one or more separate chips, and/or are partially or wholly implemented within a chip comprising processor 122. In various embodiments, SCVR 110 is alternatively implemented within processor 122 or within any of various other such components of system 100.

In some embodiments, memory 116 comprises one or more memory blocks to provide additional RAM to the processor 122. Memory 116 is implemented, for example, with any suitable memory including but not limited to dynamic RAM (DRAM), static RAM (SRAM), flash memory, or the like. In an embodiment, radios 118 wirelessly couple processor 122 to a wireless network (not shown). In some embodiments, user interface devices 120 include one or more devices such as a display, keypad, mouse, etc. to allow a user to interact with and perceive information from the system 100.

The illustrated SCVR 110 comprises multiple circuits—referred to herein as "converter cores" (or, for brevity, simply "cores")—which are coupled in parallel with each other, and which are to function as a switched-capacitor (SC) DC-DC converter. In one such embodiment, a DC input voltage signal/level/potential is received, for example, from a battery (not shown) or other rail source that is included in—or alternatively, is to couple to—system 100. Based on the received input voltage, the converter cores generate an output voltage, which processor core 122 (and/or other circuitry of system 100) uses during operation thereof—e.g., to perform various computing tasks.

By way of illustration and not limitation, SCVR 110 comprises multiple converter cores (such as the illustrative cores 124a, . . . , 124x shown) which are variously coupled to each other via each of multiple buses. The multiple buses comprise a bus 111 which is to receive an input voltage V1, a bus 112 which provides an output voltage Vout, and one or more other buses such as the illustrative charge redistribution buses CRBs 132a, . . . , 132y shown. For example, voltage V1 comprises one of a common collector voltage Vcc, or a source supply voltage Vss.

Cores 124a, . . . , 124x operate in combination with each other, and with the multiple buses, as a voltage converter which generates voltage Vout based on voltage V1. In one such embodiment, the generation of voltage Vout comprises two or more converter cores—e.g., including cores 124a, . . . , 124x-distributing charges via some or all of bus 111, bus 112, and CRBs 132a, . . . , 132y. Such charge redistribution is facilitated at least in part with switch circuits of a given converter core.

By way of illustration and not limitation, a given one of cores 124a, . . . , 124x—in this example embodiment, core 124a—comprises at least one capacitor (not shown), and a switch network 130 comprising switch circuits which are electrically coupled to each other. For example, switch network 130 comprises switches which are variously coupled between a given terminal of the capacitor, and a respective one or more of the multiple buses. Branches of switch network 130 (e.g., the branches each comprising a respective one or more switches) variously extend each to facilitate the selective provisioning of a conductive path between the capacitor and a respective one of the multiple buses.

In various embodiments, SCVR 110 includes—or alternatively, accommodates coupling to—circuitry (such as that of the illustrative control signal generator 140 shown) which generates one or more control signals to operate switch circuits of switch network 130 and/or one or more of any other switch networks of cores 124a, . . . , 124x. For example, control signal generator 140 provides to cores 124a, . . . , 124x respective control signals 142a, . . . , 142x which variously operate switch circuitry of the voltage converter. In one such embodiment, switch network 130 is configured to receive a first one or more control signals (e.g., including the illustrative control signal 142a shown), and based thereon, to selectively provide any of various conductive paths each between a first terminal of the capacitor and a different respective bus of the multiple buses. In some embodiments, some or all of control signals 142a, . . . , 142x are generated based on a clock signal Clk 128 which determines a sequential transitioning of a given one of cores 124a, . . . , 124x between various switch states (or "phases") each comprising a respective combination of states of various switch circuits.

The multiple buses further comprise an additional bus 113 by which cores 124a, . . . , 124x, are to receive another input voltage V2 (e.g., wherein voltages V1, V2 comprise a common collector voltage Vcc and a source supply voltage Vss). In one such embodiment, voltage Vout is generated further based on voltage V2—e.g., wherein core 124a further comprises a second switch network (not shown), and the generating of Vout comprises cores 124a, . . . , 124x further distributing charges with the second switch network. For example, switch network 130 is coupled to the capacitor of core 124a via a first terminal thereof, wherein a second switch network of core 124a is coupled to that same capacitor via a second terminal thereof. Based on a first one or more control signals from control signal generator 140, switch network 130 selectively couples the first terminal to any of a first plurality of buses of the multiple buses. Similarly, based on a second one or more control signals from control signal generator 140, the second switch network selectively couples the second terminal to any of a second plurality of buses of the multiple buses. In one such embodiment, the first plurality of buses comprises bus 111, bus 112, and one or more of CRBs 132a, . . . , 132y—e.g., wherein the second plurality of buses comprises bus 113, bus 112, and a different one or more of CRBs 132a, . . . , 132y.

In various embodiments, successively coupling the capacitor of core 124a to various ones of the multiple buses takes place in combination one or more others of cores 124a, . . . , 124x each similarly coupling respective capacitors to said buses at various times. This enables charges to be variously (re) distributed between capacitors of cores 124a, . . . , 124x to facilitate the generation of voltage Vout based on voltages V1, V2. In one such embodiment, two or more of cores 124a, . . . , 124x each include a respective one or more switch networks, the operation of which exhibits features such as those described herein.

To facilitate efficient voltage regulation according to some embodiments, control signal generator 140 (or other suitable logic which is include in, or is to couple to, system 100) provides functionality to configure any of multiple available modes according to which control signal generator 140 is to control operation of core 124a, . . . , 124x. While it is operating according to such a mode, control signal generator 140 uses some or all of control signals 142a, 142x to variously transition one or more switch networks—each at a respective one of cores 124a, . . . , 124x-through a respective sequence of switch states.

In this particular context (unless otherwise indicated), "switch state" refers herein to a state of a switch network—e.g., wherein the state comprises a combination of respective "component" switch (sub) states, each of a respective individual switch circuit of the switch network. With respect to an individual switch circuit of such a switch network, "component switch state"—also referred to herein as an "activation state"—is one of an active ("closed circuit") state wherein a conductive path through the switch circuit is enabled, or an inactive ("open circuit") state wherein the conductive path through the switch circuit is disabled. As used herein, "charge redistribution phase" (or simply "phase") refers herein to a period of time during which a given switch state is provided in a sequence of switch states (or "switch state sequence"). It is noted, however, that such use of the term "phase" is to be distinguished from the phase of an individual periodic signal.

In the illustrative embodiment shown, control signal generator 140 includes mode logic 144—comprising hardware, firmware, executing software and/or other suitable logic—which includes or is otherwise operable to access configuration state information (CSI) 146. At a given time, CSI 146 stores one or more configuration parameters which specify or otherwise indicate a mode according to which some or all of control signals 142a, . . . , 142x are to control one or more of cores 124a, . . . , 124x. As described herein, CSI 146 (or other such state of control signal generator 140) is selectively configured—e.g., including reconfigured— based on a configuration signal 141 that (for example) indicates one or more characteristics of power delivery by SCVR 110. Based on CSI 146, mode logic 144 signals a given switch network (at core 124a, for example) to various change the activation states of its respective switch circuits.

FIG. 2 shows features of a method 200 to operate a switched-capacitor voltage regulator according to an embodiment. Method 200 illustrates one example of an embodiment to facilitate voltage regulation with a SCVR core according to one of many available control modes, which each correspond to a different respective sequence of switch states. Operations such as those of method 200 are performed, for example, with some or all of system 100.

As shown in FIG. 2, method 200 comprises (at 210) receiving an indication of a characteristic of a delivery of power with a SC voltage converter. For example, the SC voltage converter comprises multiple buses, and multiple cores which are each coupled to the multiple buses—e.g., wherein the multiple buses comprise buses 111, 112, 113, and CRBs 132a, . . . , 132y. In some embodiments, a first core (e.g., core 124a) of the multiple cores comprises a capacitor, and a first switch network which is coupled between a terminal of the capacitor and various ones of the multiple buses. In one such embodiment, the first switch network comprises first switch circuits which are each coupled between a first terminal of the capacitor, and a different respective bus of the multiple buses.

Based on the indication received at 210, method 200 (at 212) performs a selection of a first mode from among multiple available modes of a controller which is to operate switch circuitry of the multiple cores. The controller is (or otherwise includes) control signal generator 140, for example. The multiple modes each correspond to a different respective sequence of switch states of the first core. For example, for each such mode, the controller is to provide to a respective one or more control signals with which switch circuitry of the first core is to be transitioned through various switch states according to a corresponding sequence. In an embodiment, such a mode is further to variously transition each of one or more other cores through various switch states according to the same sequence.

In one example embodiment, selection circuitry (and/or other suitable logic which performs the selecting at 212) comprises, has access to, or otherwise operates based on reference information which identifies a correspondence of various power delivery characteristics each to a different respective mode of the multiple modes. The selection logic performs a search and/or other access of said reference information, based on the indication received at 210, to determine that the first mode corresponds to the indicated characteristic.

Based on the selection performed at 212, method 200 (at 214), performs a transition of the controller to the first mode. For example, a configuration parameter (e.g., at a mode register and/or other suitable resource of the controller) is updated to specify or otherwise indicate the controller is to generate switch control signals according to the first mode. Based on the first mode, the controller is to transition the first core through a first plurality of switch states according to a first sequence.

For example, method 200 further comprises (at 216) signaling the SC voltage converter, with the controller, to transition the first core through the first plurality of switch states according to the first sequence. However, in other embodiments, method 200 omits the signaling at 216

In some embodiments, the multiple modes further comprise a second mode which corresponds to a second sequence of a second plurality of switch states. For example, method 200 further comprises other operations (not shown) to similarly transition the controller to the second mode based on a second indication—e.g., while the controller is in the first mode—of a second characteristic of the delivery of power with the SC voltage converter. In one such embodiment, a total number of the first plurality of switch states is different than a total number of the second plurality of switch states. For example, each of the multiple modes corresponds to a different respective total number P of phases of the sequence (and, for example, a different respective total number of switch states of the sequence). Additionally or alternatively, a given mode is to provide a respective switch state of a switch network, wherein that switch state concurrently provides multiple conductive paths which each extend to the same capacitor terminal, and to a different respective bus.

Figure 3:
FIG. 3 shows a functional block diagram illustrating features of a system to select one of multiple possible modes to operate a switched-capacitor voltage regulator according to an embodiment.

FIG. 3 shows features of a system 300 which is to configure one of multiple available modes for controlling operation of a SCVR according to an embodiment. System 300 illustrates one example of an embodiment which provides functionality to set control circuitry to a mode which determines a sequence according to which a SCVR core is transitioned between various switch states. In various embodiments, system 300 provides functionality such as that of system 100—e.g., wherein one or more operations of method 200 are performed with some or all of system 300.

As shown in FIG. 3, system 300 comprises a SCVR 301 which includes a SC voltage converter, and a control signal generator 340 to variously operate multiple cores of the SC voltage converter. The multiple cores—e.g., including cores 305a, 305b, 305c—are coupled to multiple buses which, in this example, comprise a bus to receive an input voltage Vin, a bus to receive another input voltage Vss, a bus to provide an output voltage Vout (based on voltages Vin, Vout), M "top" charge redistribution buses (CRBs), and N "bottom" CRBs. In this particular context, "top" and "bottom" correspond (respectively) to a relatively high voltage Vin provided via a first switch network, and a relatively low voltage Vss provided via a first switch network. Moreover, M and N are integers which are each greater than one (1).

Each of cores 305a, 305b, 305c comprises a respective charge storage (e.g., including one or more capacitors) and a respective two switch networks. For example, core 305a comprises a charge storage 302, wherein terminals of charge storage 302 are coupled at respective nodes 304, 306. A first switch network of core 305a is coupled between a first terminal of charge storage 302 (at node 304) and first ones of the multiple buses. In the example embodiment shown, the first switch network comprises switch circuits STin, Stout which are coupled between node 304 and (respectively) the Vin bus and the Vout bus. The first switch network further comprises M switch circuits ST1, . . . , STM which are coupled between node 304 and (respectively) the M top CRBs T1, . . . , TM.

Furthermore, a second switch network of core 305a is coupled between a second terminal of charge storage 302 (at node 306) and second ones of the multiple buses. In the example embodiment shown, the second switch network comprises switch circuits SBss, SBout which are coupled between node 304 and (respectively) the Vss bus and the Vout bus. The second switch network further comprises N switch circuits SB1, . . . , SBN which are coupled between node 304 and (respectively) the N bottom CRBs B1, . . . , BN. Similar switch network topologies are also provided with cores 305b, 305c.

Control signal generator 340 provides functionality to generate control signals 342 to operate some or all of the multiple cores. Such operation is based on a current mode of control signal generator 340, wherein control signal generator 340 is (re) configurable to any of multiple modes which each correspond to a different respective switch state sequence. For example, a first mode corresponds to a first switch state sequence which has a first total number of phases (and/or a first total number of switch states)—e.g., wherein a second mode corresponds to a second switch state sequence which has a different total number of phases (and/or a different total number of switch states).

In the example embodiment shown, SCVR 301 is coupled to (or alternatively, includes) one or more sensor(s) 310 which are operable to sense one or more characteristics of a delivery of power with SCVR 301. By way of illustration and not limitation, the one or more characteristics comprise a level, rate of change, and/or other characteristic(s) of the output voltage Vout. Additionally or alternatively, the one or more characteristics comprises a level, rate of change, and/or other characteristic(s) of an output current with which SCVR 301 provides Vout. However, sensor(s) 310 sense any of various additional or alternative characteristics, in other embodiments.

Some or all of the one or more characteristics are indicated (e.g., via the illustrative signal 312 shown) to a monitor 320 of system 300. Monitor 320 monitors signal 312 to detect for a change (if any) to the one or more characteristics. In some embodiments, monitor 320 comprises circuitry and/or other suitable logic to determine which one of multiple criteria is currently satisfied by the one or more characteristics. In one such embodiment, each the multiple criteria—e.g., the each criteria for providing a respective mode of control signal generator 340—includes a respective range for each of the one or more characteristics. By way of illustration and not limitation, a given criteria comprises a range of values for the output voltage Vout, a range of values for an output current at the Vout bus, and/or the like. Based on a change to the one or more characteristics, monitor 320 sends to a mode selector 330 of system 300 a signal 322 which specifies or otherwise indicates a particular criteria as being currently satisfied.

Mode selector 330 includes, has access to, or otherwise operates based on reference information (not shown) which identifies various criteria as corresponding each to a different respective mode of control signal generator 340. Based on the criteria indicated with signal 312, mode selector 330 accesses such reference information to identify a mode to configure for control signal generator 340.

For example, mode selector 330 sends to control signal generator 340 a signal 332 which sets one or more values of configuration state information (CSI) 346. In an embodiment, control signal generator 340 generates control signals 342 based on configuration state information (CSI) 346 and mode logic 344 which specifies or otherwise indicates, for each of multiple modes, a respective switch state sequence to be provided with a given one of cores 305a, 305b, 305ca, 305b, 305c.

By way of illustration and not limitation, mode logic 344 includes a table (or other suitable data structure) comprising entries which each correspond to a different respective configurable mode of control signal generator 340. For example, such a table comprises a first entry-identified with an index value 343a-which includes information 345a identifying a first sequence of first switch states. In an embodiment, the first switch states are each to couple a respective one or more buses to charge storage 302 via node 304, and to further couple a respective one or more other buses to charge storage 302 via node 306. In one such embodiment, the table further comprises a second entry—identified with an index value 343y-which includes information 345y identifying a second sequence of second switch states.

In various embodiments, sensor(s) 310, monitor 320, mode selector 330, and control signal generator 340 operate—while Vout is provided with system 300—to repeatedly update the mode(s) according to which cores 305a, 305b, 305c are operated with signals 342. Although SCVR 301 is shown as being coupled to, and distinct from, some other components of system 300, in various embodiments, some or all of sensor(s) 310, monitor 320, and mode selector 330 are incorporated in SCVR 301. In some embodiments, SCVR 301, cores 305a-c, control signal generator 340, mode logic 344, and CSI 346 correspond functionally to SCVR 110, cores 124a-x, control signal generator 140, mode logic 144, and CSI 146 (respectively).

Figure 4:
FIG. 4 shows a circuit diagram illustrating features of a switched-capacitor voltage regulator comprising cores which are coupled via charge redistribution buses according to an embodiment.

FIG. 4 shows features of a switched-capacitor (SC) converter core 400 which is to be coupled to one or more other such cores via charge redistribution buses according to an embodiment. SC converter core 400 illustrates one example of an embodiment wherein two or more switch networks—to be operated according to any of multiple configurable modes—are provided by a core to facilitate coupling with another one or more cores. In various embodiments, SC converter core 400 provides functionality such as that of core 124a or core 305a—e.g., wherein one or more operations of method 200 are performed with, or otherwise facilitate operation of, SC converter core 400.

As shown in FIG. 4, SC converter core 400 comprises a first switch network, a second switch network, and a capacitor 402 coupled therebetween. In the example embodiment shown, switch circuits of the first switch network are variously coupled in a first in-parallel arrangement which facilitates selective coupling of capacitor 402 to any of a first plurality of buses. For example, the first plurality of buses comprises a first bus which receives a voltage Vin, a second bus to provide an output voltage Vout based on voltage Vin, and N charge redistribution buses (where N is a positive integer).

Similarly, switch circuits of the second switch network are variously coupled in a second in-parallel arrangement which facilitates selective coupling of capacitor 402 to any of a second plurality of buses. For example, the second plurality of buses comprises the second bus (which provides voltage Vout), a third bus which is to receive another input voltage Vss, and another M charge redistribution buses (where M is a positive integer). In the example embodiment shown, N=M=8—e.g., wherein the first plurality of buses comprises the illustrative charge redistribution buses (CRBs) T1 through T8, and the second plurality of buses comprises the illustrative CRBs B1 through B8. In one such embodiment, a SCVR which includes core 400 has a total of (1+2N+2M) =33 converter cores. Although some embodiments are not limited in this regard, individual switch circuits of SC converter core 400 are implemented each with a different respective transistor—e.g., including thin-oxide transistors to enable a wide Vout range (with a Vin of 2V, for example).

By way of illustration and not limitation, the first switch network comprises transistors 410a-e, 412a-e, 414a-e, and 416a-e. Transistors 410a-e are coupled, in series with transistors 412a-e (respectively), each between a node 404—at a first (e.g., "top") terminal of capacitor 402—and a respective bus of the first plurality of buses. To facilitate a distribution of charge with SC converter core 400 and another core, transistors 410a-e, 412a-e, 414a-e, and 416a-e are selectively operated by control signals 411a-e, 413a-e, 415a-e, and 417a-e (respectively) to selectively provide one or more conductive paths each between node 404 and a respective bus of the first plurality of buses.

Similarly, the second switch network comprises transistors 420a-e, 422a-e, 424a-e, and 426a-e. Transistors 420a-e are coupled, in series with transistors 422a-e (respectively), each between a node 406—at a second (e.g., "bottom") terminal of capacitor 402—and a respective bus of the second plurality of buses. Furthermore, transistors 420a-e, 422a-e, 424a-e, and 426a-e are selectively operated by control signals 421a-e, 423a-e, 425a-e, and 427a-e (respectively) to selectively provide one or more conductive paths each between node 406 and a respective bus of the first plurality of buses. In some embodiments, nodes 404, 406 are each further coupled to a different respective two bootstrap capacitors (not shown) to promote conductance over the wide range of voltages. For example, some or all such bootstrap capacitors are variously charged each when a respective CRB is switchedly coupled to the Vout bus.

Figure 5:
FIG. 5 shows a timing diagram illustrating features of operations by a switched-capacitor voltage regulator according to an embodiment.

FIG. 5 shows features of a timing diagram 500 illustrating operations performed, with a switched-capacitor voltage regulator, during one of multiple configurable control modes according to an embodiment. For example, operations such as those represented in timing diagram 500 are performed with one of cores 124a . . . 124x, one of cores 305a, 305b, 305c, or core 400—e.g., wherein some or all of method 200 includes or otherwise facilitates such operations.

As shown in FIG. 5, timing diagram 500 shows various conductive paths which are successively provided by a converter core over a period of time 502. The converter core comprises a first switch network, a second switch network, and a capacitor which is coupled between the first and second switch networks. For example, the capacitor, first switch network, and second switch network correspond functionally to capacitor 402, the switch network of core 400 which is coupled to capacitor 402 via node 406, and the other switch network of core 400 which is coupled to capacitor 402 via node 404. In one such embodiment, the first switch network is operated with first control signals which (for example) correspond functionally to switch control signals 421a-e, 423a-e, 425a-e, and 427a-e. By contrast, the second switch network is operated with second control signals which (for example) correspond functionally to switch control signals 411a-e, 413a-e, 415a-e, and 417a-e.

In the example embodiment represented with timing diagram 500, the converter core is to be coupled to multiple buses comprising a first "Vin" bus which is to receive a first input voltage, a second "Vss" bus which is to receive a second input voltage, and a third "Vout" bus with which the voltage converter is to provide an output voltage based on the first and second input voltages. The multiple buses further comprise M charge redistribution buses T1, . . . , TM, and N additional charge redistribution buses B1, . . . , BN (where M and N are positive integers). In one such embodiment, a clock cycle—e.g., a single cycle of a reference clock signal—is divided into some number of phases to coordinate operation of the converter core with one or more other cores. For each such phase, a corresponding switch state of the converter core is to be configured to switchedly couple the capacitor to a respective two (or more) of the multiple buses. Such switch states are provided sequentially to facilitate a distribution of charges with the converter core and one or more other cores. In timing diagram 500, arrows represent various directions of charge distribution through the capacitor of the converter core.

In the example embodiment shown, a first plurality of switch states of the first switch network are successively configured according to a first sequence based on the first control signals. The first plurality of switch states comprises a first switch state (during a phase ending at time t1) wherein the first switch network provides a conductive path, via the capacitor, between the Vss bus and the Vout bus. In an embodiment, the first plurality of switch states further comprises N switch states, each corresponding to a different respective bus of CRBs B1, . . . , BN. For each of the N switch states (which are configured sequentially during the N phases between time t1 and time t2), the switch state provides a respective conductive path, via the capacitor, between the Vout bus and the corresponding one of CRBs B1, . . . , BN.

In some embodiments, the sequence of switch states represented in timing diagram 500 further comprises a second plurality of switch states of the second switch network, which (for example) are successively configured according to a second sequence based on the second control signals. For example, the second plurality of switch states comprises M switch states which each correspond to a different respective bus of CRBs T1, . . . , TM. For each of the M switch states (which are configured sequentially during the M phases between time t2 and time t3), the switch state provides a respective conductive path, via the capacitor, between the Vout bus and the corresponding one of CRBs T1, . . . , TM. In the embodiment shown, the second plurality of switch states further comprises another switch state (during a phase between times t3, t4) wherein the second switch network provides a conductive path, via the capacitor, between the Vout bus and the Vin bus In one such embodiment, the sequence of switch states represented in timing diagram 500 further comprises a third sequence of a third plurality of switch states which are provided with both the first switch network and the second switch network—e.g., based on both the first control signals and the second control signals. For example, the third plurality of switch states comprises another N switch states (e.g., configured sequentially during the N phases between time t4 and time t5) which each correspond to a different respective bus of CRBs B1, . . . , BN. For each of the other N switch states, the switch state provides a respective conductive path, via the capacitor, between the Vin bus and the corresponding one of CRBs B1, . . . , BN.

In one such embodiment, the sequence of switch states represented in timing diagram 500 further comprises a fourth sequence of a fourth plurality of switch states of the first switch network and the second switch network. For example, the fourth plurality of switch states are successively configured according to a fourth sequence based on the first and second control signals. In an embodiment, the fourth plurality of switch states comprises another M switch states which each correspond to a different respective bus of CRBs T1, . . . , TM. For each of the fourth plurality of switch states, the switch state provides a respective conductive path, via the capacitor, between the Vss bus and the corresponding one of CRBs T1, . . . , TM.

In some embodiments, the operations illustrated in timing diagram 500 are performed with circuitry which is configurable to any of multiple modes for controlling a SCVR, wherein the modes each provide a different sequence of switch states. For example, some or all such modes are each to provide a different respective total number of phases in a given cycle. In one such embodiment, the modes each provide a respective total number of phases which is less than or equal to (2N+2M+1).

FIGS. 6A-6D show respective switch state sequences 600, 610, 620, 630 each according to a respective mode each for controlling the same core of a given SC voltage converter. Switch operations such as those illustrated by sequences 600, 610, 620, 630 are performed, for example, with circuitry of SCVR 110, system 300, and/or SC converter core 400—e.g., wherein such operation are based on method 200.

In an embodiment, the core comprises a capacitor, a first switch network coupled to a "top" terminal of the capacitor, and a second switch network which is coupled to a "bottom" terminal of the capacitor. The core (along with one or more other cores of the same SC voltage converter) is coupled to multiple buses—e.g., wherein the first switch network is to selectively provide one or more conductive paths between the top terminal and one or more of the multiple buses, and wherein the second switch network is to selectively provide one or more conductive paths between the bottom terminal and one or more other of the multiple buses.

For example, the multiple buses comprise a "Vin bus" which is to receive a first input voltage, a "Vss bus" which is to receive a second input voltage, and a "Vout bus" which is to provide an output voltage which is based on the first input voltage and the second input voltage. Furthermore, the multiple buses comprise two top CRBs T1 and T2 which are to be switchedly coupled, via respective switch circuits of the first switch network, to the top terminal. Further still, the multiple buses comprise five bottom CRBs B1 through B5 which are to be switchedly coupled, via respective switch circuits of the second switch network, to the bottom terminal.

As shown in FIG. 6A, sequence 600 takes place—according to a first control mode-during a cycle which is divided into thirty phases (0 through 29), where respective switch states of the first switch network and the second switch network are to be provided during each such phase. In the example embodiment show, during phase 0 of sequence 600, a switch state is provided wherein a conductive path is switchedly provided between the top terminal and the Vout bus, and wherein a conductive path is switchedly provided between the bottom terminal and the Vss bus. Subsequently, during phase 1 of sequence 600, another switch state is provided wherein a conductive path is switchedly provided between the top terminal and the Vout bus, and wherein a conductive path is switchedly provided between the bottom terminal and CRB B5. Subsequently, during phase 3 of sequence 600, another switch state is provided wherein a conductive path is switchedly provided between the top terminal and the Vout bus, and wherein a conductive path is switchedly provided between the bottom terminal and CRB B4. Various other switch states of sequence 600 are similarly shown in FIG. 6A.

As shown in FIG. 6B, sequence 610 takes place-according to a second control mode—during a cycle which is instead divided into twenty-six phases (0 through 25), where respective switch states of the first switch network and the second switch network are to be provided during each such phase. Sequence 620 illustrates an embodiment wherein a total number of phases (and/or a total number of switch states) of one configurable sequence is different than that which is provided by another configurable sequence.

Sequence 620 further illustrates an embodiment which configures a switch state wherein multiple conductive paths are provided each between the same terminal of a capacitor, and a different respective bus.

For example, in the illustrative embodiment show, during phase 11 of sequence 610, a switch state is provided wherein a conductive path is switchedly provided between the top terminal and each of CRBs T1, T2, and wherein a conductive path is switchedly provided between the bottom terminal and the Vout bus. Such a switch state is effectively a merging of the active switch states during phases 12 and 13 of sequence 600. In this particular context, such "merging" effectively shorts two or more buses to each other, and to a terminal of a capacitor, via switch circuits which are active during a given switch mode. Accordingly, in some embodiments, two switch circuits—coupled in parallel with each other to the same capacitor terminal—are both active during a switch state of one switch state sequence. However, during a switch state of another such switch state sequence, only one of the two switch circuits is active.

Furthermore, during phase 24 of sequence 610, a switch state is provided wherein a conductive path is switchedly provided between the top terminal and each of CRBs T1, T2, and wherein a conductive path is switchedly provided between the bottom terminal and the Vss bus. Such a switch state is effectively a merging of the active switch states during phases 27 and 28 of sequence 600. Various switch states of sequence 610 are shown in FIG. 6B.

Figure 6C:

As shown in FIG. 6C, sequence 620 takes place-according to a third control mode-during a cycle which is instead divided into fourteen phases (0 through 13), where respective switch states of the first switch network and the second switch network are to be provided during each such phase. During phase 1 of sequence 620, a switch state is provided wherein a conductive path is switchedly provided between the top terminal and the Vout bus, and wherein a conductive path is switchedly provided between the bottom terminal and each of the CRBs B1 through B5. Such a switch state is effectively a merging of the active switch states during phases 1, 3, 5, 7, and 9 of sequence 600.

Furthermore, during phase 8 of sequence 620, a switch state is provided wherein a conductive path is switchedly provided between the top terminal and the Vin bus, and wherein a conductive path is switchedly provided between the bottom terminal and each of the CRBs B1 through B5. This switch state is effectively a merging of the active switch states during phases 16, 18, 20, 22, and 24 of sequence 600. Various other switch states of sequence 620 are similarly shown in FIG. 6C.

Figure 6D:
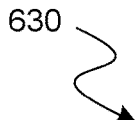

As shown in FIG. 6D, sequence 630 takes place-according to a fourth control mode—during a cycle which is instead divided into ten phases (0 through 9), where respective switch states of the first switch network and the second switch network are to be provided during each such phase. It is noted (for example) that the switch state during phase 1 of sequence 630 is the same as that during phase 1 of sequence 620, and that the switch state during phase 3 of sequence 630 is the same as that during phase 11 of sequence 610. Furthermore, the switch state during phase 6 of sequence 630 is the same as that during phase 8 of sequence 620, wherein the switch state during phase 8 of sequence 630 is the same as that during phase 24 of sequence 610. Various other switch states of sequence 630 are similarly shown in FIG. 6D.

Some embodiments select a particular one of multiple modes (e.g., including selecting from among modes which each correspond to a respective one of sequences 600, 610, 620, 630) based on one or more characteristics of power delivery with a SC voltage converter. For example, the one or more characteristics include (or are otherwise indicative of) an output voltage, an output current, and/or the like.

In an illustrative scenario for one embodiment, a sensing of such one or more characteristics includes or otherwise results in the detection of an increase of an output voltage which is provided with the SC voltage converter. Based on said increase, one such embodiment transitions controller circuitry, such as that of control signal generator 140, from a mode which provides a switch state sequence having relatively more phases (and/or more switch states), to another mode which provides a switch state sequence having relatively fewer phases (and/or fewer switch states). Conversely, a decreased output voltage—in some embodiments-results in a transition from a mode which provides a switch state sequence having relatively fewer phases (and/or fewer switch states), to another mode which provides a switch state sequence having relatively more phases (and/or more switch states). In one such embodiment, a range of output voltage levels corresponds to a relatively high number of phases (and/or switch states) to be provided with the SC voltage converter—e.g., wherein the number of phases and/or switch states to be provided is lower if the output voltage is either above or below said range.

Additionally or alternatively, sensing one or more characteristics includes or otherwise results in the detection of an increase of an output current. Based on said increased current, one embodiment transitions the controller circuitry from a mode which provides a switch state sequence having relatively more phases (and/or more switch states), to another mode which provides a switch state sequence having relatively fewer phases (and/or fewer switch states). Conversely, a decreased output current—in some embodiments-results in a transition from a mode which provides a switch state sequence having relatively fewer phases (and/or fewer switch states), to another mode which provides a switch state sequence having relatively more phases (and/or more switch states).

FIG. 7 shows features of a SC voltage converter 700 to redistribute charge between various cores according to an embodiment. In various embodiments, SC voltage converter 700 provides functionality such as that of SCVR 110, or SCVR 301—e.g., wherein one or more operations of method 200 are performed with SC voltage converter 700.

As shown in FIG. 7, SC voltage converter 700 comprises converter cores 710*a*, . . . , 710*z* which are coupled to variously distribute charges with each other via multiple buses. In various embodiments, cores 710*a*, . . . , 710*z* each correspond functionally to a respective one of cores 124*a*, . . . , 124*x*—e.g., wherein some or all of cores 710*a*, . . . , 710*z* each have features of one of cores 305*a-c*, or of core 400, for example. In one such embodiment, cores 710*a*, . . . , 710*z* each comprise a respective capacitor, and respective switch networks each to selectively provide conductive paths, at different times, between that respective capacitor and various ones of the multiple buses.

For example, a given one of cores 710*a*, . . . , 710*z*, comprises two switch networks, one of which is coupled between the respective capacitor and a first plurality of buses, and the other of which is coupled between the respective capacitor and a second plurality of buses. In the example embodiment shown, the first plurality of buses comprises a first bus which receives a voltage Vin, a second bus to provide an output voltage Vout based on voltage Vin, and M charge redistribution buses T1, . . . , TM (where M is a positive integer). By contrast, the second plurality of buses comprises the second bus (which provides voltage Vout), a third bus which is to receive another input voltage Vss, and N other charge redistribution buses B1, . . . , BN (where N is a positive integer). In one such embodiment, a total number X of the cores 710*a*, . . . , 710*z* of SC voltage converter 700 is equal to the sum (1+2N+2M).

In various embodiments, SC voltage converter 700 further comprises, couples to, or otherwise accommodates operation with, control circuitry—such as that of control signal generator 140—which provides control signals (not shown) to operate the respective switch networks of cores 710a, . . . , 710z. For example, the control circuitry supports any of various modes which are each to provide a different respective sequence of switch states for some or all of cores 710a, . . . , 710z in a given cycle. In one such embodiment, the control signals comprise periodic signals (referred to herein as "non-overlapping clock signals") which have a same frequency, but non-overlapping phases.

FIG. 8 shows features of a method 800 to operate a SCVR according to another embodiment. Method 800 illustrates one example of an embodiment wherein various modes of controller circuitry—e.g., including modes each corresponding to a different respective switch state sequence—are successively configured dynamically during operation of a SCVR. Operations such as those of method 800 are performed, for example, with circuitry system 100, system 300, SC converter core 400, SC voltage converter 700—e.g., wherein method 800 includes operations of method 200.

As shown in FIG. 8, method 800 comprises (at 810) monitoring a characteristic of power delivery with a SC voltage converter. The monitoring at 810 is performed, for example, with monitor 320 based on the one or more characteristics indicated by signal 312. Method 800 further comprises performing an evaluation (at 812) to determine whether the characteristic monitored at 810 has changed. Where it is determined at 812 that the monitored characteristic has not changed, method 800 performs a next instance of the monitoring at 810.

Where it is instead determined at 812 that the monitored characteristic has changed, method 800 performs an evaluation (at 814) to determine whether the changed characteristic corresponds to a currently-configured control mode according to which the SC voltage converter is operated. For example, the evaluation performed at 814 includes determining, based at least in part on the changed characteristic, whether a criteria for configuring a different control mode is now satisfied.

Where it is determined at 814 that the changed characteristic corresponds to the currently-configured control mode, method 800 (at 820) signals the SC voltage converter to provide respective switch states according to a switch state sequence which corresponds to the currently-configured control mode. Where it is instead determined at 814 that the changed characteristic corresponds to different control mode, method 800 (at 816) selects a next control mode to be configured from among multiple available modes of a controller. In an embodiment the selected next control mode is one for which a corresponding criteria is currently satisfied, based on the changed characteristic. After the selecting at 816, method 800 (at 818) transitions the controller to the selected next control mode—e.g., wherein the selected next mode becomes the currently-configured mode of the controller. Based on the transitioning at 818, method 800 performs a next instance of the signaling at 820, after which method 800 performs a next instance of the monitoring at 810.

In some embodiments, at least one switch network of a given converter core is what is referred to herein as a "hierarchical switch network." A hierarchical switch network (HSN) comprises multiple hierarchical levels (or "tiers") of respective switches—e.g., wherein a switch circuit in a first ("higher") hierarchical level is coupled to selectively provide a conductive path to each of multiple switch circuits in a second ("lower") level. In one such embodiment, a HSN has a branching tree topology including (for example) multiple switch circuits in a highest hierarchical level.

In providing one or more HSNs of a converter core, some embodiments reduce the cost, space, and/or control signaling requirements for SC converter circuitry—e.g., as compared to conventional voltage converter designs. For example, some existing SCVRs types—e.g., including various continuous capacitive voltage regulator (C2VR) designs—provide for the switched coupling of a converter core's capacitor to any of multiple buses. However, these designs variously include multiple branches which are each coupled, independent of each other, between the capacitor and a corresponding bus. To enable a wide range for an output voltage (Vout)—for example, given an input voltage (Vin) of 2V—each such branch includes a respective two or more transistors which are coupled in series only with each other (e.g., and not in series with any transistor of a different branch).

Some embodiments further provide one or more additional efficiencies using a HSN which (for example) provides an alternative to the functionality of multiple switches of a conventional SC converter circuits—e.g., multiple switches which would otherwise be in different respective branches. More particularly, various embodiments effectively substitute such multiple switches with a single switch circuit which is to be in a relatively high hierarchical level of a HSN—e.g., where the single switch circuit is coupled (for example, in a branching tree topology) to multiple other switch circuits each in a relatively low hierarchical level of that HSN.

For example, FIG. 9 shows features of a SC converter core 900 to provide switched coupling with a capacitor according to an embodiment. SC converter core 900 illustrates one example of an embodiment wherein selective electrical coupling, between a capacitor and various terminals and/or charge redistribution buses, is provided with a HSN. In various embodiments, SC converter core 900 provides functionality such as that of core 124a—e.g., wherein one or more operations of method 200 (or method 800) are performed with SC converter core 900.

As shown in FIG. 9, SC converter core 900 comprises a capacitor 902 and a HSN 910 which is coupled to capacitor 902 via a node 904 at a terminal of capacitor 902. In an embodiment, HSN 910 is coupled between node 904 and a plurality of buses by which SC converter core 900 is to distribute charges with one or more other cores of a SCVR. For example, SC converter core 900 is coupled via respective terminals 940, 941 to buses 111, 112 (or other such buses to receive an input voltage, and to provide an output voltage). Furthermore, SC converter core 900 is variously coupled to charge distribution buses each via a respective one of nodes 950-953.

In the example embodiment shown, HSN 910 has a branching tree network topology comprising multiple hierarchical levels (or "tiers")—e.g., including the illustrative levels 920, 930 shown—of respective switch circuits. For example, level 920 of HSN 910 comprises a first plurality of switch circuits, such as switches S1A, S4A. Level 930 of HSN 910 comprises a second plurality of switch circuits including, for example, switches S1B, S2B, S3B, S4B, S5B, and S6B. In one such embodiment, switch S1A is coupled between node 904 and each of switches S1B, S2B, and S3B—e.g., wherein switch S4A is coupled between node 904 and each of switches S4B, S5B, and S6B. However, the number of the multiple levels in HSN 910, the numbers of switches in any one such level, the number of the multiple buses, and the various coupling of switches in different levels, is merely illustrative and not limiting on some embodiments.

Figure 10:
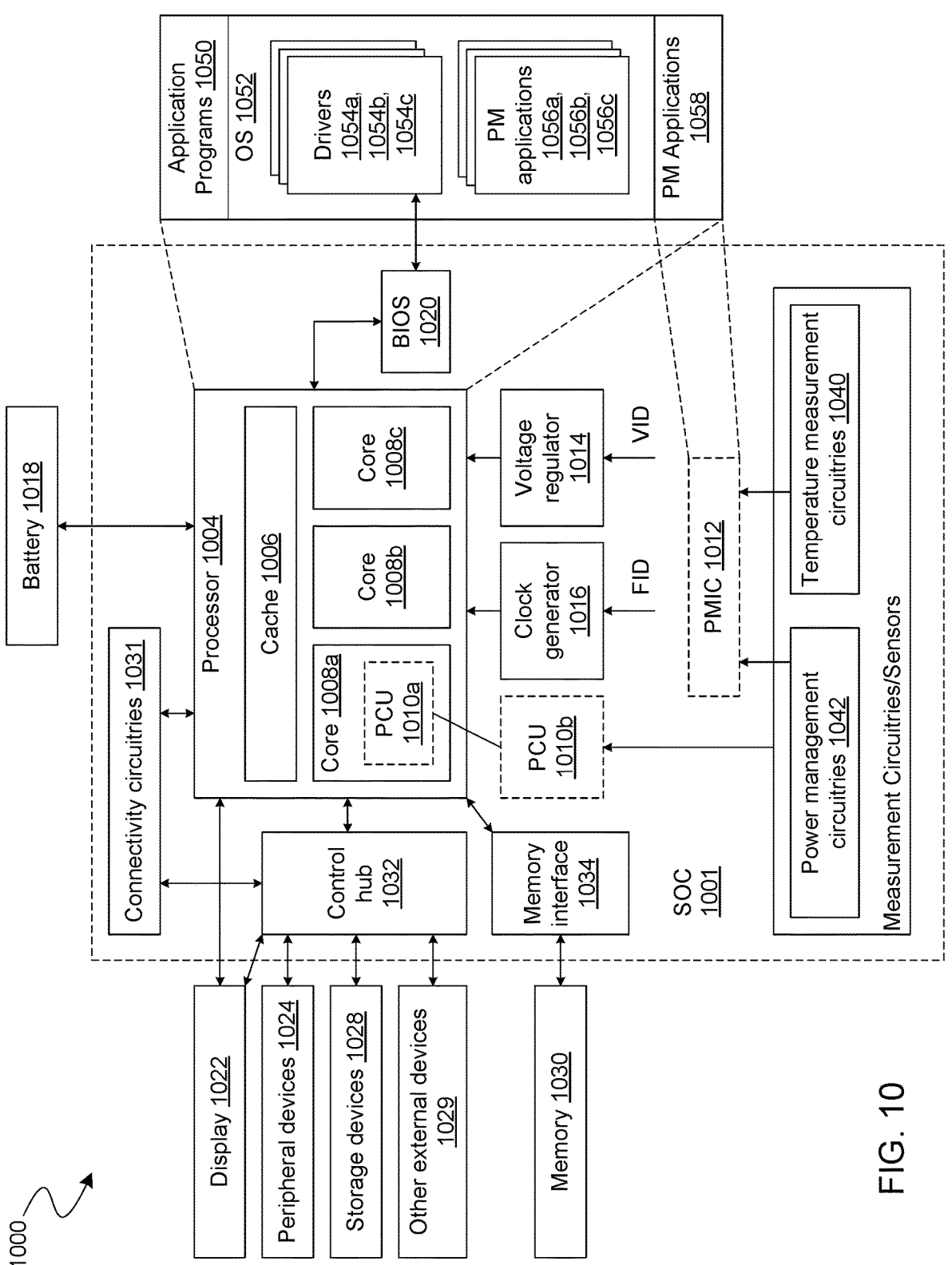
FIG. 10 shows a functional block diagram illustrating features of a computer device to operate based on a delivery of power with a switched capacitor voltage regulator according to an embodiment.

FIG. 10 illustrates a computer system or computing device 1000 (also referred to as device 1000) to operate based on power delivered with a switched-capacitor voltage regulator in accordance with some embodiments. It is pointed out that those elements of FIG. 10 having the same reference numbers (or names) as the elements of any other figure can operate or function in any manner similar to that described, but are not limited to such.

In some embodiments, device 1000 represents an appropriate computing device, such as a computing tablet, a mobile phone or smart-phone, a laptop, a desktop, an Internet-of-Things (IoT) device, a server, a wearable device, a set-top box, a wireless-enabled e-reader, or the like. It will be understood that certain components are shown generally, and not all components of such a device are shown in device 1000.

In an example, the device 1000 comprises a SoC (System-on-Chip) 1001. An example boundary of the SOC 1001 is illustrated using dotted lines in FIG. 10, with some example components being illustrated to be included within SOC 1001—however, SOC 1001 may include any appropriate components of device 1000.

In some embodiments, device 1000 includes processor 1004. Processor 1004 can include one or more physical devices, such as microprocessors, application processors, microcontrollers, programmable logic devices, processing cores, or other processing means. The processing operations performed by processor 1004 include the execution of an operating platform or operating system on which applications and/or device functions are executed. The processing operations include operations related to I/O (input/output) with a human user or with other devices, operations related to power management, operations related to connecting computing device 1000 to another device, and/or the like. The processing operations may also include operations related to audio I/O and/or display I/O.

In some embodiments, processor 1004 includes multiple processing cores (also referred to as cores) 1008a, 1008b, 1008c. Although merely three cores 1008a, 1008b, 1008c are illustrated in FIG. 10, the processor 1004 may include any other appropriate number of processing cores, e.g., tens, or even hundreds of processing cores. Processor cores 1008a, 1008b, 1008c may be implemented on a single integrated circuit (IC) chip. Moreover, the chip may include one or more shared and/or private caches, buses or interconnections, graphics and/or memory controllers, or other components.

In some embodiments, processor 1004 includes cache 1006. In an example, sections of cache 1006 may be dedicated to individual cores 1008 (e.g., a first section of cache 1006 dedicated to core 1008a, a second section of cache 1006 dedicated to core 1008b, and so on). In an example, one or more sections of cache 1006 may be shared among two or more of cores 1008. Cache 1006 may be split in different levels, e.g., level 1 (L1) cache, level 2 (L2) cache, level 3 (L3) cache, etc.

In some embodiments, a given processor core (e.g., core 1008a) may include a fetch unit to fetch instructions (including instructions with conditional branches) for execution by the core 1008a. The instructions may be fetched from any storage devices such as the memory 1030. Processor core 1008a may also include a decode unit to decode the fetched instruction. For example, the decode unit may decode the fetched instruction into a plurality of micro-operations. Processor core 1008a may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 1008a (for example) may be an out-of-order processor core in one embodiment. Processor core 1008a may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 1008a may also include a bus unit to enable communication between components of the processor core 1008a and other components via one or more buses. Processor core 1008a may also include one or more registers to store data accessed by various components of the core 1008a (such as values related to assigned app priorities and/or sub-system states (modes) association.

In some embodiments, device 1000 comprises connectivity circuitries 1031. For example, connectivity circuitries 1031 includes hardware devices (e.g., wireless and/or wired connectors and communication hardware) and/or software components (e.g., drivers, protocol stacks), e.g., to enable device 1000 to communicate with external devices. Device 1000 may be separate from the external devices, such as other computing devices, wireless access points or base stations, etc.

In an example, connectivity circuitries 1031 may include multiple different types of connectivity. To generalize, the connectivity circuitries 1031 may include cellular connectivity circuitries, wireless connectivity circuitries, etc. Cellular connectivity circuitries of connectivity circuitries 1031 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 1031 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 1031 may include a network interface, such as a wired or wireless interface, e.g., so that a system embodiment may be incorporated into a wireless device, for example, cell phone or personal digital assistant.

In some embodiments, device 1000 comprises control hub 1032, which represents hardware devices and/or software components related to interaction with one or more I/O devices. For example, processor 1004 may communicate with one or more of display 1022, one or more peripheral devices 1024, storage devices 1028, one or more other external devices 1029, etc., via control hub 1032. Control hub 1032 may be a chipset, a Platform Control Hub (PCH), and/or the like.

For example, control hub 1032 illustrates one or more connection points for additional devices that connect to device 1000, e.g., through which a user might interact with the system. For example, devices (e.g., devices 1029) that can be attached to device 1000 include microphone devices, speaker or stereo systems, audio devices, video systems or other display devices, keyboard or keypad devices, or other I/O devices for use with specific applications such as card readers or other devices.

As mentioned above, control hub 1032 can interact with audio devices, display 1022, etc. For example, input through a microphone or other audio device can provide input or commands for one or more applications or functions of device 1000. Additionally, audio output can be provided instead of, or in addition to display output. In another example, if display 1022 includes a touch screen, display 1022 also acts as an input device, which can be at least partially managed by control hub 1032. There can also be additional buttons or switches on computing device 1000 to provide I/O functions managed by control hub 1032. In one embodiment, control hub 1032 manages devices such as accelerometers, cameras, light sensors or other environmental sensors, or other hardware that can be included in device 1000. The input can be part of direct user interaction, as well as providing environmental input to the system to influence its operations (such as filtering for noise, adjusting displays for brightness detection, applying a flash for a camera, or other features).

In some embodiments, control hub 1032 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 1022 represents hardware (e.g., display devices) and software (e.g., drivers) components that provide a visual and/or tactile display for a user to interact with device 1000. Display 1022 may include a display interface, a display screen, and/or hardware device used to provide a display to a user. In some embodiments, display 1022 includes a touch screen (or touch pad) device that provides both output and input to a user. In an example, display 1022 may communicate directly with the processor 1004. Display 1022 can be one or more of an internal display device, as in a mobile electronic device or a laptop device or an external display device attached via a display interface (e.g., DisplayPort, etc.). In one embodiment display 1022 can be a head mounted display (HMD) such as a stereoscopic display device for use in virtual reality (VR) applications or augmented reality (AR) applications.

In some embodiments and although not illustrated in the figure, in addition to (or instead of) processor 1004, device 1000 may include Graphics Processing Unit (GPU) comprising one or more graphics processing cores, which may control one or more aspects of displaying contents on display 1022.

Control hub 1032 (or platform controller hub) may include hardware interfaces and connectors, as well as software components (e.g., drivers, protocol stacks) to make peripheral connections, e.g., to peripheral devices 1024.

It will be understood that device 1000 could both be a peripheral device to other computing devices, as well as have peripheral devices connected to it. Device 1000 may have a "docking" connector to connect to other computing devices for purposes such as managing (e.g., downloading and/or uploading, changing, synchronizing) content on device 1000. Additionally, a docking connector can allow device 1000 to connect to certain peripherals that allow computing device 1000 to control content output, for example, to audiovisual or other systems.

In addition to a proprietary docking connector or other proprietary connection hardware, device 1000 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 1031 may be coupled to control hub 1032, e.g., in addition to, or instead of, being coupled directly to the processor 1004. In some embodiments, display 1022 may be coupled to control hub 1032, e.g., in addition to, or instead of, being coupled directly to processor 1004.

In some embodiments, device 1000 comprises memory 1030 coupled to processor 1004 via memory interface 1034. Memory 1030 includes memory devices for storing information in device 1000. Memory can include nonvolatile (state does not change if power to the memory device is interrupted) and/or volatile (state is indeterminate if power to the memory device is interrupted) memory devices. Memory device 1030 can be a dynamic random access memory (DRAM) device, a static random access memory (SRAM) device, flash memory device, phase-change memory device, or some other memory device having suitable performance to serve as process memory. In one embodiment, memory 1030 can operate as system memory for device 1000, to store data and instructions for use when the one or more processors 1004 executes an application or process. Memory 1030 can store application data, user data, music, photos, documents, or other data, as well as system data (whether long-term or temporary) related to the execution of the applications and functions of device 1000.

Elements of various embodiments and examples are also provided as a machine-readable medium (e.g., memory 1030) for storing the computer-executable instructions (e.g., instructions to implement any other processes discussed herein). The machine-readable medium (e.g., memory 1030) may include, but is not limited to, flash memory, optical disks, CD-ROMs, DVD ROMs, RAMS, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 1000 comprises temperature measurement circuitries 1040, e.g., for measuring temperature of various components of device 1000. In an example, temperature measurement circuitries 1040 may be embedded, or coupled or attached to various components, whose temperature are to be measured and monitored. For example, temperature measurement circuitries 1040 may measure temperature of (or within) one or more of cores 1008*a*, 1008*b*, 1008*c*, voltage regulator 1014, memory 1030, a mother-board of SOC 1001, and/or any appropriate component of device 1000.

In some embodiments, device 1000 comprises power measurement circuitries 1042, e.g., for measuring power consumed by one or more components of the device 1000. In an example, in addition to, or instead of, measuring power, the power measurement circuitries 1042 may measure voltage and/or current. In an example, the power measurement circuitries 1042 may be embedded, or coupled or attached to various components, whose power, voltage, and/or current consumption are to be measured and monitored. For example, power measurement circuitries 1042 may measure power, current and/or voltage supplied by one or more voltage regulators 1014, power supplied to SOC 1001, power supplied to device 1000, power consumed by processor 1004 (or any other component) of device 1000, etc.

In some embodiments, device 1000 comprises one or more voltage regulator circuitries, generally referred to as voltage regulator (VR) 1014. VR 1014 generates signals at appropriate voltage levels, which may be supplied to operate any appropriate components of the device 1000. Merely as an example, VR 1014 is illustrated to be supplying signals to processor 1004 of device 1000. In some embodiments, VR 1014 receives one or more Voltage Identification (VID) signals, and generates the voltage signal at an appropriate level, based on the VID signals. Various type of VRs may be utilized for the VR 1014. For example, VR 1014 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 1010*a/b* and/or PMIC 1012. In some embodiments, each core has a network of distributed LDOs to provide efficient control for power management. The LDOs can be digital, analog, or a combination of digital or analog LDOs.

In some embodiments, device 1000 comprises one or more clock generator circuitries, generally referred to as clock generator 1016. Clock generator 1016 generates clock signals at appropriate frequency levels, which may be supplied to any appropriate components of device 1000. Merely as an example, clock generator 1016 is illustrated to be supplying clock signals to processor 1004 of device 1000. In some embodiments, clock generator 1016 receives one or more Frequency Identification (FID) signals, and generates the clock signals at an appropriate frequency, based on the FID signals.

In some embodiments, device 1000 comprises battery 1018 supplying power to various components of device

1000. Merely as an example, battery 1018 is illustrated to be supplying power to processor 1004. Although not illustrated in the figures, device 1000 may comprise a charging circuitry, e.g., to recharge the battery, based on Alternating Current (AC) power supply received from an AC adapter.

In some embodiments, device 1000 comprises Power Control Unit (PCU) 1010 (also referred to as Power Management Unit (PMU), Power Controller, etc.). In an example, some sections of PCU 1010 may be implemented by one or more processing cores 1008, and these sections of PCU 1010 are symbolically illustrated using a dotted box and labelled PCU 1010*a*. In an example, some other sections of PCU 1010 may be implemented outside the processing cores 1008, and these sections of PCU 1010 are symbolically illustrated using a dotted box and labelled as PCU 1010*b*. PCU 1010 may implement various power management operations for device 1000. PCU 1010 may include hardware interfaces, hardware circuitries, connectors, registers, etc., as well as software components (e.g., drivers, protocol stacks), to implement various power management operations for device 1000.

In some embodiments, device 1000 comprises Power Management Integrated Circuit (PMIC) 1012, e.g., to implement various power management operations for device 1000. In some embodiments, PMIC 1012 is a Reconfigurable Power Management ICs (RPMICs) and/or an IMVP (Intel® Mobile Voltage Positioning). In an example, the PMIC is within an IC chip separate from processor 1004. The may implement various power management operations for device 1000. PMIC 1012 may include hardware interfaces, hardware circuitries, connectors, registers, etc., as well as software components (e.g., drivers, protocol stacks), to implement various power management operations for device 1000.

In an example, device 1000 comprises one or both PCU 1010 or PMIC 1012. In an example, any one of PCU 1010 or PMIC 1012 may be absent in device 1000, and hence, these components are illustrated using dotted lines.

Various power management operations of device 1000 may be performed by PCU 1010, by PMIC 1012, or by a combination of PCU 1010 and PMIC 1012. For example, PCU 1010 and/or PMIC 1012 may select a power state (e.g., P-state) for various components of device 1000. For example, PCU 1010 and/or PMIC 1012 may select a power state (e.g., in accordance with the ACPI (Advanced Configuration and Power Interface) specification) for various components of device 1000. Merely as an example, PCU 1010 and/or PMIC 1012 may cause various components of the device 1000 to transition to a sleep state, to an active state, to an appropriate C state (e.g., CO state, or another appropriate C state, in accordance with the ACPI specification), etc. In an example, PCU 1010 and/or PMIC 1012 may control a voltage output by VR 1014 and/or a frequency of a clock signal output by the clock generator, e.g., by outputting the VID signal and/or the FID signal, respectively. In an example, PCU 1010 and/or PMIC 1012 may control battery power usage, charging of battery 1018, and features related to power saving operation.

The clock generator 1016 can comprise a phase locked loop (PLL), frequency locked loop (FLL), or any suitable clock source. In some embodiments, each core of processor 1004 has its own clock source. As such, each core can operate at a frequency independent of the frequency of operation of the other core. In some embodiments, PCU 1010 and/or PMIC 1012 performs adaptive or dynamic frequency scaling or adjustment. For example, clock frequency of a processor core can be increased if the core is not operating at its maximum power consumption threshold or limit. In some embodiments, PCU 1010 and/or PMIC 1012 determines the operating condition of each core of a processor, and opportunistically adjusts frequency and/or power supply voltage of that core without the core clocking source (e.g., PLL of that core) losing lock when the PCU 1010 and/or PMIC 1012 determines that the core is operating below a target performance level. For example, if a core is drawing current from a power supply rail less than a total current allocated for that core or processor 1004, then PCU 1010 and/or PMIC 1012 can temporarily increase the power draw for that core or processor 1004 (e.g., by increasing clock frequency and/or power supply voltage level) so that the core or processor 1004 can perform at a higher performance level. As such, voltage and/or frequency can be increased temporality for processor 1004 without violating product reliability.

In an example, PCU 1010 and/or PMIC 1012 may perform power management operations, e.g., based at least in part on receiving measurements from power measurement circuitries 1042, temperature measurement circuitries 1040, charge level of battery 1018, and/or any other appropriate information that may be used for power management. To that end, PMIC 1012 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 1010 and/or PMIC 1012 in at least one embodiment to allow PCU 1010 and/or PMIC 1012 to manage processor core energy at least in part based on value(s) detected by one or more of the sensors.

Also illustrated is an example software stack of device 1000 (although not all elements of the software stack are illustrated). Merely as an example, processors 1004 may execute application programs 1050, Operating System 1052, one or more Power Management (PM) specific application programs (e.g., generically referred to as PM applications 1058), and/or the like. PM applications 1058 may also be executed by the PCU 1010 and/or PMIC 1012. OS 1052 may also include one or more PM applications 1056*a*, 1056*b*, 1056*c*. The OS 1052 may also include various drivers 1054*a*, 1054*b*, 1054*c*, etc., some of which may be specific for power management purposes. In some embodiments, device 1000 may further comprise a Basic Input/Output System (BIOS) 1020. BIOS 1020 may communicate with OS 1052 (e.g., via one or more drivers 1054), communicate with processors 1004, etc.

For example, one or more of PM applications 1058, 1056, drivers 1054, BIOS 1020, etc. may be used to implement power management specific tasks, e.g., to control voltage and/or frequency of various components of device 1000, to control wake-up state, sleep state, and/or any other appropriate power state of various components of device 1000, control battery power usage, charging of the battery 1018, features related to power saving operation, etc.

In an embodiment, VR 1014 comprises SCVR circuitry including multiple converter cores which are coupled in parallel with each other. The cores, which comprise respective capacitors, are coupled to each other via multiple buses including one or more charge redistribution buses. A distribution of charges between some or all of the respective capacitors is facilitated with respective switch circuitry of the converter cores. In one such embodiment, some or all such switch circuitry is operated according to one of multiple configurable modes of VR 1014, wherein two or more such modes correspond to different respective sequences of switch states (e.g., including sequences each with different respective total number of switch states).

Techniques and architectures for operating a switched-capacitor voltage regulator are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

In one or more first embodiments, a voltage regulator (VR) comprises a switched-capacitor (SC) voltage converter comprising multiple buses, and multiple cores each coupled to the multiple buses, wherein a first core of the multiple cores comprises a capacitor, and a first switch network comprising first switch circuits which are each coupled between a first terminal of the capacitor, and a different respective bus of the multiple buses, a controller coupled to the the SC voltage converter, the controller comprising first circuitry to operate the SC voltage converter according to any of the multiple modes which each correspond to a different respective sequence of switch states of the first core, second circuitry, coupled to the first circuitry, to receive a signal which identifies a first mode of the multiple modes, and transition the first circuitry to the first mode based on the signal, wherein, based on the first mode, the first circuitry is to transition the first core through a first plurality of switch states according to a first sequence.

In one or more second embodiments, further to the first embodiment, a second mode of the multiple modes corresponds to a second sequence of a second plurality of switch states, and wherein a total number of the first plurality of switch states is different than a total number of the second plurality of switch states.

In one or more third embodiments, further to the first embodiment, a second mode of the multiple modes corresponds to a second sequence of a second plurality of switch states, wherein one of the first plurality of switch states or the second plurality of switch states comprises a first switch state wherein a first conductive path between the first terminal and a first bus is enabled while a second conductive path between the first terminal and a second bus is disabled, and wherein the other of the first plurality of switch states or the second plurality of switch states comprises a second switch state wherein the first conductive path is enabled while the second conductive path is enabled.

In one or more fourth embodiments, further to the third embodiment, the first core further comprises a second switch network comprising second switch circuits which are each coupled between a second terminal of the capacitor, and a different respective bus of the multiple buses, wherein a third mode of the multiple modes corresponds to a third sequence of a third plurality of switch states, wherein one of the first plurality of switch states or the third plurality of switch states comprises a third switch state wherein a third conductive path between the second terminal and a third bus is enabled while a fourth conductive path between the second terminal and a third bus is disabled, and wherein the other of the first plurality of switch states or the third plurality of switch states comprises a fourth switch state wherein the third conductive path is enabled while the fourth conductive path is enabled.

In one or more fifth embodiments, further to any of the first through third embodiments, the second circuitry is further to receive, while the first circuitry is in the first mode, a second signal which identifies a second mode of the multiple modes, and transition the first circuitry from the first mode to the second mode based on the second signal, wherein, based on the second mode, the first circuitry is to transition the first core through a second plurality of switch states according to a second sequence.

In one or more sixth embodiments, further to the fifth embodiment, one of the first plurality of switch states or the second plurality of switch states comprises a first switch state wherein a first conductive path between the first terminal and a first bus is enabled while a second conductive path between the first terminal and a second bus is disabled, and wherein the other of the first plurality of switch states or the second plurality of switch states comprises a second switch state wherein the first conductive path is enabled while the second conductive path is enabled.

In one or more seventh embodiments, further to the fifth embodiment, the second circuitry to receive the second signal comprises the second circuitry to detect an increase of an output voltage provided with the SC voltage converter, and wherein a total number of the second plurality of switch states is less than a total number of the first plurality of switch states.

In one or more eighth embodiments, further to the fifth embodiment, the second circuitry to receive the second indication comprises the second circuitry to detect an increase of an output current provided with the SC voltage converter, and wherein a total number of the second plurality of switch states is less than a total number of the first plurality of switch states.

In one or more ninth embodiments, further to the eighth embodiment, the first plurality of switch states comprises a first switch state wherein a first conductive path between the first terminal and a first bus is enabled while a second conductive path between the first terminal and a second bus is disabled, and wherein the second plurality of switch states comprises a second switch state wherein the first conductive path is enabled while the second conductive path is enabled.

In one or more tenth embodiments, a device comprises first circuitry to receive an indication of a characteristic of a delivery of power with a switched-capacitor (SC) voltage converter, wherein the SC voltage converter is to comprise multiple buses, and multiple cores each coupled to the multiple buses, wherein a first core of the multiple cores is to comprise a capacitor, and a first switch network comprising first switch circuits which are each coupled between a first terminal of the capacitor, and a different respective bus of the multiple buses, the first circuitry further to perform a selection of a first mode from among multiple modes based on the indication, wherein the multiple modes each correspond to a different respective sequence of switch states of the first core, and second circuitry to operate the SC voltage converter according to any of the multiple modes, wherein, responsive to the first circuitry, the second circuitry is to transition to the first mode based on the selection, and wherein, based on the first mode, the second circuitry is to transition the first core through a first plurality of switch states according to a first sequence.

In one or more eleventh embodiments, further to the tenth embodiment, the device further comprises the SC voltage converter.

In one or more twelfth embodiments, further to the tenth embodiment or the eleventh embodiment, a second mode of the multiple modes corresponds to a second sequence of a second plurality of switch states, and wherein a total number of the first plurality of switch states is different than a total number of the second plurality of switch states.

In one or more thirteenth embodiments, further to the tenth embodiment or the eleventh embodiment, a second mode of the multiple modes corresponds to a second sequence of a second plurality of switch states, wherein one of the first plurality of switch states or the second plurality of switch states comprises a first switch state wherein a first conductive path between the first terminal and a first bus is enabled while a second conductive path between the first terminal and a second bus is disabled, and wherein the other of the first plurality of switch states or the second plurality of switch states comprises a second switch state wherein the first conductive path is enabled while the second conductive path is enabled.

In one or more fourteenth embodiments, further to the thirteenth embodiment, the first core further comprises a second switch network comprising second switch circuits which are each coupled between a second terminal of the capacitor, and a different respective bus of the multiple buses, wherein a third mode of the multiple modes corresponds to a third sequence of a third plurality of switch states, wherein one of the first plurality of switch states or the third plurality of switch states comprises a third switch state wherein a third conductive path between the second terminal and a third bus is enabled while a fourth conductive path between the second terminal and a third bus is disabled, and wherein the other of the first plurality of switch states or the third plurality of switch states comprises a fourth switch state wherein the third conductive path is enabled while the fourth conductive path is enabled.

In one or more fifteenth embodiments, further to any of the tenth through thirteenth embodiments, the first circuitry is further to receive, during the first mode, a second indication of a second characteristic of the delivery of power, perform a second selection of a second mode from among multiple modes based on the second indication, and the second circuitry is further to perform a second transition of the second circuitry from the first mode to the second mode based on the second selection, and signal the SC voltage converter, based on the second mode, to transition the first core through a second plurality of switch states according to a second sequence.

In one or more sixteenth embodiments, further to the fifteenth embodiment, one of the first plurality of switch states or the second plurality of switch states comprises a first switch state wherein a first conductive path between the first terminal and a first bus is enabled while a second conductive path between the first terminal and a second bus is disabled, and wherein the other of the first plurality of switch states or the second plurality of switch states comprises a second switch state wherein the first conductive path is enabled while the second conductive path is enabled.

In one or more seventeenth embodiments, further to the fifteenth embodiment, the first circuitry to receive the second indication comprises the first circuitry to detect an increase of an output voltage provided with the SC voltage converter, and wherein a total number of the second plurality of switch states is less than a total number of the first plurality of switch states.

In one or more eighteenth embodiments, further to the fifteenth embodiment, the first circuitry to receive the second indication comprises the first circuitry to detect an increase of an output current provided with the SC voltage converter, and wherein a total number of the second plurality of switch states is less than a total number of the first plurality of switch states.

In one or more nineteenth embodiments, a system comprises a switched-capacitor (SC) voltage converter comprising multiple buses, and multiple cores each coupled to the multiple buses, wherein a first core of the multiple cores comprises a capacitor, and a first switch network comprising first switch circuits which are each coupled between a first terminal of the capacitor, and a different respective bus of the multiple buses, first circuitry to receive an indication of a characteristic of a delivery of power with the SC voltage converter, and further to perform a selection of a first mode from among multiple modes based on the indication, wherein the multiple modes each correspond to a different respective sequence of switch states of the first core, and second circuitry to operate the SC voltage converter according to any of the multiple modes, wherein, responsive to the first circuitry, the second circuitry is to transition to the first mode based on the selection, and wherein, based on the first mode, the second circuitry is to transition the first core through a first plurality of switch states according to a first sequence, and a display device coupled to the SC voltage converter, the display device to display an image based on the delivery of power.

In one or more twentieth embodiments, further to the nineteenth embodiment, a second mode of the multiple modes corresponds to a second sequence of a second plurality of switch states, and wherein a total number of the first plurality of switch states is different than a total number of the second plurality of switch states.

In one or more twenty-first embodiments, further to the nineteenth embodiment or the twentieth embodiment, a second mode of the multiple modes corresponds to a second sequence of a second plurality of switch states, wherein one of the first plurality of switch states or the second plurality of switch states comprises a first switch state wherein a first conductive path between the first terminal and a first bus is enabled while a second conductive path between the first terminal and a second bus is disabled, and wherein the other of the first plurality of switch states or the second plurality of switch states comprises a second switch state wherein the first conductive path is enabled while the second conductive path is enabled.

In one or more twenty-second embodiments, further to the twenty-first embodiment, the first core further comprises a second switch network comprising second switch circuits which are each coupled between a second terminal of the capacitor, and a different respective bus of the multiple buses, wherein a third mode of the multiple modes corresponds to a third sequence of a third plurality of switch states, wherein one of the first plurality of switch states or the third plurality of switch states comprises a third switch state wherein a third conductive path between the second terminal and a third bus is enabled while a fourth conductive path between the second terminal and a third bus is disabled, and wherein the other of the first plurality of switch states or the third plurality of switch states comprises a fourth switch state wherein the third conductive path is enabled while the fourth conductive path is enabled.

In one or more twenty-third embodiments, further to any of the nineteenth through twenty-first embodiments, the first circuitry is further to receive, during the first mode, a second indication of a second characteristic of the delivery of power, perform a second selection of a second mode from among multiple modes based on the second indication, and the second circuitry is further to perform a second transition of the second circuitry from the first mode to the second mode based on the second selection, and signal the SC voltage converter, based on the second mode, to transition the first core through a second plurality of switch states according to a second sequence.

In one or more twenty-fourth embodiments, further to the twenty-third embodiment, one of the first plurality of switch states or the second plurality of switch states comprises a first switch state wherein a first conductive path between the first terminal and a first bus is enabled while a second conductive path between the first terminal and a second bus is disabled, and wherein the other of the first plurality of switch states or the second plurality of switch states comprises a second switch state wherein the first conductive path is enabled while the second conductive path is enabled.

In one or more twenty-fifth embodiments, further to the twenty-third embodiment, the first circuitry to receive the second indication comprises the first circuitry to detect an increase of an output voltage provided with the SC voltage converter, and wherein a total number of the second plurality of switch states is less than a total number of the first plurality of switch states.

In one or more twenty-sixth embodiments, further to the twenty-third embodiment, the first circuitry to receive the second indication comprises the first circuitry to detect an increase of an output current provided with the SC voltage converter, and wherein a total number of the second plurality of switch states is less than a total number of the first plurality of switch states.

In one or more twenty-seventh embodiments, further to the twenty-sixth embodiment, the first plurality of switch states comprises a first switch state wherein a first conductive path between the first terminal and a first bus is enabled while a second conductive path between the first terminal and a second bus is disabled, and wherein the second plurality of switch states comprises a second switch state wherein the first conductive path is enabled while the second conductive path is enabled.

In one or more twenty-eighth embodiments, a method at a controller comprises receiving an indication of a characteristic of a delivery of power with a switched-capacitor (SC) voltage converter, wherein the SC voltage converter comprises multiple buses, and multiple cores each coupled to the multiple buses, wherein a first core of the multiple cores comprises a capacitor, and a first switch network comprising first switch circuits which are each coupled between a first terminal of the capacitor, and a different respective bus of the multiple buses, and based on the indication, performing a selection of a first mode from among multiple modes of the controller, wherein the multiple modes each correspond to a different respective sequence of switch states of the first core, based on the selection, performing a transition of the controller to the first mode, wherein, based on the first mode, the controller is to transition the first core through a first plurality of switch states according to a first sequence.

In one or more twenty-ninth embodiments, further to the twenty-eighth embodiment, the method further comprises signaling the SC voltage converter to transition the first core through the first plurality of switch states according to the first sequence.

In one or more thirtieth embodiments, further to the twenty-eighth embodiment or the twenty-ninth embodiment, a second mode of the multiple modes corresponds to a second sequence of a second plurality of switch states, and wherein a total number of the first plurality of switch states is different than a total number of the second plurality of switch states.

In one or more thirty-first embodiments, further to the twenty-eighth embodiment or the twenty-ninth embodiment, a second mode of the multiple modes corresponds to a second sequence of a second plurality of switch states, wherein one of the first plurality of switch states or the second plurality of switch states comprises a first switch state wherein a first conductive path between the first terminal and a first bus is enabled while a second conductive path between the first terminal and a second bus is disabled, and wherein the other of the first plurality of switch states or the second plurality of switch states comprises a second switch state wherein the first conductive path is enabled while the second conductive path is enabled.

In one or more thirty-second embodiments, further to the thirty-first embodiment, the first core further comprises a second switch network comprising second switch circuits which are each coupled between a second terminal of the capacitor, and a different respective bus of the multiple buses, wherein a third mode of the multiple modes corresponds to a third sequence of a third plurality of switch states, wherein one of the first plurality of switch states or the third plurality of switch states comprises a third switch state wherein a third conductive path between the second terminal and a third bus is enabled while a fourth conductive path between the second terminal and a third bus is disabled, and wherein the other of the first plurality of switch states or the third plurality of switch states comprises a fourth switch state wherein the third conductive path is enabled while the fourth conductive path is enabled.

In one or more thirty-third embodiments, further to any of the twenty-eighth through thirty-first embodiments, the method further comprises receiving, during the first mode, a second indication of a second characteristic of the delivery of power, based on the second indication, performing a second selection of a second mode from among multiple modes, based on the second selection, performing a second transition of the controller from the first mode to the second mode, and signaling the SC voltage converter, based on the second mode, to transition the first core through a second plurality of switch states according to a second sequence.

In one or more thirty-fourth embodiments, further to the thirty-third embodiment, one of the first plurality of switch states or the second plurality of switch states comprises a first switch state wherein a first conductive path between the first terminal and a first bus is enabled while a second conductive path between the first terminal and a second bus is disabled, and wherein the other of the first plurality of switch states or the second plurality of switch states comprises a second switch state wherein the first conductive path is enabled while the second conductive path is enabled.

In one or more thirty-fifth embodiments, further to the thirty-third embodiment, receiving the second indication comprises detecting an increase of an output voltage provided with the SC voltage converter, and wherein a total number of the second plurality of switch states is less than a total number of the first plurality of switch states.

In one or more thirty-sixth embodiments, further to the thirty-third embodiment, receiving the second indication comprises detecting an increase of an output current provided with the SC voltage converter, and wherein a total number of the second plurality of switch states is less than a total number of the first plurality of switch states.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A voltage regulator (VR) comprising:
a switched-capacitor (SC) voltage converter comprising multiple buses, and multiple cores each coupled to the multiple buses, wherein a first core of the multiple cores includes:
a first capacitor; and
a first switch network comprising first switch circuits which are each coupled between a first terminal of the first capacitor, and a different respective bus of the multiple buses allowing the first terminal of the first capacitor to be coupled to a selected second capacitor from any of two or more others of the multiple cores;
a controller coupled to the SC voltage converter, the controller comprising:
first circuitry to operate the SC voltage converter according to any of the multiple modes which each correspond to a different respective sequence of switch states of the first core;
second circuitry, coupled to the first circuitry, to:
receive a signal which identifies a first mode of the multiple modes; and
transition the first circuitry to the first mode based on the signal;
wherein, based on the first mode, the first circuitry is to transition the first core through a first plurality of switch states according to a first sequence.

2. The VR of claim 1, wherein a second mode of the multiple modes corresponds to a second sequence of a second plurality of switch states, and wherein a total number of the first plurality of switch states is different than a total number of the second plurality of switch states.

3. The VR of claim 1, wherein a second mode of the multiple modes corresponds to a second sequence of a second plurality of switch states;
wherein one of the first plurality of switch states or the second plurality of switch states comprises a first switch state wherein a first conductive path between the first terminal and a first bus is enabled while a second conductive path between the first terminal and a second bus is disabled; and
wherein the other of the first plurality of switch states or the second plurality of switch states comprises a second switch state wherein the first conductive path is enabled while the second conductive path is enabled.

4. The VR of claim 3, wherein the first core further comprises a second switch network comprising second switch circuits which are each coupled between a second terminal of the first capacitor, and a different respective bus of the multiple buses;
wherein a third mode of the multiple modes corresponds to a third sequence of a third plurality of switch states;
wherein one of the first plurality of switch states or the third plurality of switch states comprises a third switch state wherein a third conductive path between the second terminal and a third bus is enabled while a fourth conductive path between the second terminal and a third bus is disabled; and
wherein the other of the first plurality of switch states or the third plurality of switch states comprises a fourth switch state wherein the third conductive path is enabled while the fourth conductive path is enabled.

5. The VR of claim 1, wherein the second circuitry is further to:

receive, while the first circuitry is in the first mode, a second signal which identifies a second mode of the multiple modes; and
transition the first circuitry from the first mode to the second mode based on the second signal;
wherein, based on the second mode, the first circuitry is to transition the first core through a second plurality of switch states according to a second sequence.

6. The VR of claim 5, wherein one of the first plurality of switch states or the second plurality of switch states comprises a first switch state wherein a first conductive path between the first terminal and a first bus is enabled while a second conductive path between the first terminal and a second bus is disabled; and
wherein the other of the first plurality of switch states or the second plurality of switch states comprises a second switch state wherein the first conductive path is enabled while the second conductive path is enabled.

7. The VR of claim 5, wherein the second circuitry to receive the second signal comprises the second circuitry to detect an increase of an output voltage provided with the SC voltage converter; and
wherein a total number of the second plurality of switch states is less than a total number of the first plurality of switch states.

8. The VR of claim 5, wherein the second circuitry to receive the second indication comprises the second circuitry to detect an increase of an output current provided with the SC voltage converter; and
wherein a total number of the second plurality of switch states is less than a total number of the first plurality of switch states.

9. The VR of claim 8, wherein the first plurality of switch states comprises a first switch state wherein a first conductive path between the first terminal and a first bus is enabled while a second conductive path between the first terminal and a second bus is disabled; and
wherein the second plurality of switch states comprises a second switch state wherein the first conductive path is enabled while the second conductive path is enabled.

10. A device comprising:
first circuitry to receive an indication of a characteristic of a delivery of power with a switched-capacitor (SC) voltage converter, wherein the SC voltage converter includes multiple buses, and multiple cores each coupled to the multiple buses, wherein a first core of the multiple cores includes a first capacitor; and
a first switch network comprising first switch circuits which are each coupled between a first terminal of the first capacitor, and a different respective bus of the multiple buses, the different respective bus of the multiple buses including connections to at least two other capacitors from two or more different other cores;
the first circuitry further to perform a selection of a first mode from among multiple modes based on the indication, wherein the multiple modes each correspond to a different respective sequence of switch states of the first core; and
second circuitry to operate the SC voltage converter according to any of the multiple modes, wherein, responsive to the first circuitry, the second circuitry is to transition to the first mode based on the selection, and wherein, based on the first mode, the second circuitry is to transition the first core through a first plurality of switch states according to a first sequence.

11. The device of claim 10, further comprising the SC voltage converter.

12. The device of claim 10, wherein a second mode of the multiple modes corresponds to a second sequence of a second plurality of switch states, and wherein a total number of the first plurality of switch states is different than a total number of the second plurality of switch states.

13. The device of claim 10, wherein a second mode of the multiple modes corresponds to a second sequence of a second plurality of switch states;

wherein one of the first plurality of switch states or the second plurality of switch states comprises a first switch state wherein a first conductive path between the first terminal and a first bus is enabled while a second conductive path between the first terminal and a second bus is disabled; and wherein the other of the first plurality of switch states or the second plurality of switch states comprises a second switch state wherein the first conductive path is enabled while the second conductive path is enabled.

14. The device of claim 13, wherein the first core further comprises a second switch network comprising second switch circuits which are each coupled between a second terminal of the first capacitor, and a different respective bus of the multiple buses;

wherein a third mode of the multiple modes corresponds to a third sequence of a third plurality of switch states;

wherein one of the first plurality of switch states or the third plurality of switch states comprises a third switch state wherein a third conductive path between the second terminal and a third bus is enabled while a fourth conductive path between the second terminal and a third bus is disabled; and wherein the other of the first plurality of switch states or the third plurality of switch states comprises a fourth switch state wherein the third conductive path is enabled while the fourth conductive path is enabled.

15. The device of claim 10, wherein:

the first circuitry is further to:

receive, during the first mode, a second indication of a second characteristic of the delivery of power;

perform a second selection of a second mode from among multiple modes based on the second indication; and the second circuitry is further to:

perform a second transition of the second circuitry from the first mode to the second mode based on the second selection; and signal the SC voltage converter, based on the second mode, to transition the first core through a second plurality of switch states according to a second sequence.

16. A system comprising:

a switched-capacitor (SC) voltage converter comprising multiple buses, and multiple cores each coupled to the multiple buses, wherein a first core of the multiple cores includes:

a first capacitor; and a first switch network comprising first switch circuits which are each coupled between a first terminal of the first capacitor, and a different respective bus of the multiple buses allowing the first terminal of the first capacitor to be coupled to a selected second capacitor from any of two or more others of the multiple cores;

first circuitry to receive an indication of a characteristic of a delivery of power with the SC voltage converter, and further to perform a selection of a first mode from among multiple modes based on the indication, wherein the multiple modes each correspond to a different respective sequence of switch states of the first core; and second circuitry to operate the SC voltage converter according to any of the multiple modes, wherein, responsive to the first circuitry, the second circuitry is to transition to the first mode based on the selection, and wherein, based on the first mode, the second circuitry is to transition the first core through a first plurality of switch states according to a first sequence; and a display device coupled to the SC voltage converter, the display device to display an image based on the delivery of power.

17. The system of claim 16, wherein a second mode of the multiple modes corresponds to a second sequence of a second plurality of switch states, and wherein a total number of the first plurality of switch states is different than a total number of the second plurality of switch states.

18. The system of claim 16, wherein a second mode of the multiple modes corresponds to a second sequence of a second plurality of switch states;

wherein one of the first plurality of switch states or the second plurality of switch states comprises a first switch state wherein a first conductive path between the first terminal and a first bus is enabled while a second conductive path between the first terminal and a second bus is disabled; and wherein the other of the first plurality of switch states or the second plurality of switch states comprises a second switch state wherein the first conductive path is enabled while the second conductive path is enabled.

19. The system of claim 18, wherein the first core further comprises a second switch network comprising second switch circuits which are each coupled between a second terminal of the first capacitor, and a different respective bus of the multiple buses;

wherein a third mode of the multiple modes corresponds to a third sequence of a third plurality of switch states;

wherein one of the first plurality of switch states or the third plurality of switch states comprises a third switch state wherein a third conductive path between the second terminal and a third bus is enabled while a fourth conductive path between the second terminal and a third bus is disabled; and wherein the other of the first plurality of switch states or the third plurality of switch states comprises a fourth switch state wherein the third conductive path is enabled while the fourth conductive path is enabled.

20. The system of claim 16, wherein:

the first circuitry is further to:

receive, during the first mode, a second indication of a second characteristic of the delivery of power;

perform a second selection of a second mode from among multiple modes based on the second indication; and the second circuitry is further to:

perform a second transition of the second circuitry from the first mode to the second mode based on the second selection; and signal the SC voltage converter, based on the second mode, to transition the first core through a second plurality of switch states according to a second sequence.

* * * * *